(12) United States Patent
Price et al.

(10) Patent No.: US 12,493,970 B2
(45) Date of Patent: *Dec. 9, 2025

(54) SMOOTH AND JUMP-FREE RAPID TARGET ACQUISITION

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/545,501

(22) Filed: Dec. 19, 2023

(65) Prior Publication Data

US 2024/0119610 A1 Apr. 11, 2024

Related U.S. Application Data

(63) Continuation of application No. 17/500,088, filed on Oct. 13, 2021, now Pat. No. 11,900,621.

(51) Int. Cl.
*G06T 7/33* (2017.01)
*G02B 27/01* (2006.01)
*G06T 7/11* (2017.01)
*G06T 7/174* (2017.01)

(52) U.S. Cl.
CPC ............. *G06T 7/33* (2017.01); *G02B 27/017* (2013.01); *G06T 7/11* (2017.01); *G06T 7/174* (2017.01); *G02B 2027/0138* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

| 8,994,822 | B2 * | 3/2015 | Smitherman | ........ | G01C 11/025 |
| | | | | | 348/144 |
| 2018/0005441 | A1 * | 1/2018 | Anderson | ............. | G06T 19/006 |
| 2021/0090333 | A1 * | 3/2021 | Ravasz | .................. | G02B 27/01 |

* cited by examiner

*Primary Examiner* — Fan Zhang
(74) *Attorney, Agent, or Firm* — Workman Nydegger

(57) ABSTRACT

Techniques for correcting an overlay misalignment between an external camera image and a system camera image are disclosed. A first system camera image and a first external camera image are acquired. A first visual alignment is performed between those two images to produce an overlaid image. Some of the content in the overlaid image is surrounded by a bounding element. A position of the bounding element is modified based on movements of the system camera and/or the external camera. In response to performing a second visual alignment using new images, an update vector is computed. Relative movement between the two cameras is determined. Based on the movement and based on the update vector, the bounding element is progressively transitioned to a corrected position in the overlaid image. A speed by which the bounding element is progressively transitioned is proportional to the amount of movement.

20 Claims, 19 Drawing Sheets

SMOOTH AND JUMP-FREE RAPID TARGET ACQUISITION

CROSS-REFERENCE TO RELATED APPLICATIONS

This application is a continuation of U.S. patent application Ser. No. 17/500,088 filed on Oct. 13, 2021, entitled "SMOOTH AND JUMP-FREE RAPID TARGET ACQUISITION," which application is expressly incorporated herein by reference in its entirety.

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

Some of these challenges occur when attempting to align image content from multiple cameras, such as an integrated "system camera" and a detached "external camera" when generating the passthrough image. Challenges also occur when additional visualizations are provided in the resulting overlaid passthrough image, where these visualizations are designed to indicate a spatial relationship between the system camera and the external camera. The time taken to i) generate a system camera image and an external camera image, ii) overlay and align the content, and then iii) display the resulting overlaid passthrough image with additional visualizations is not instantaneous. Because of that, movement of the system camera and/or the external camera may occur between the time when the images are generated and when the final passthrough image is displayed. Such movement results in a visible latency or lagging effect and is disruptive to the user. Aligning image content provides substantial benefits, especially in terms of hologram placement and generation, so these problems present serious obstacles to the technical field. Accordingly, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods for correcting an overlay misalignment between an external camera image and a system camera image. The embodiments are further configured to minimize observation of these corrections by scaling performance of the correction based on certain detected movement conditions.

Some embodiments include a system camera. The embodiments acquire a first system camera image generated by the system camera and acquire a first external camera image generated by an external camera. A first visual alignment is performed between the first system camera image and the first external camera image. The first visual alignment process involves generating an overlaid image by projecting at least some content included in the first external camera image on top of corresponding content included in the first system camera image. The overlaid content is surrounded by a bounding element in the overlaid image. The embodiments also modify a position of the bounding element in the overlaid image based on a detected movement of one or both of the system camera and the external camera. A second system camera image and a second external camera image are acquired. In response to performing a second visual alignment between the second system camera image and the second external camera image, the embodiments compute an update vector indicating an amount by which the bounding element is to be moved in order to be at a correct position. Then, the embodiments determine an amount of relative movement that the system camera and the external camera are currently experiencing relative to one another. Based on the determined amount of relative movement, the embodiments cause the bounding element to progressively transition to the correct position in the overlaid image based on the update vector. A speed by which the bounding element is progressively transitioned is proportional to the determined amount of relative movement. In doing so, the embodiments are able to beneficially "hide" the corrections from observation by a user by embedding or performing the corrections during a movement event or condition.

Some embodiments are directed to a type of head-mounted device (HMD). The HMD can include an HMD camera and an HMD inertial measurement unit (IMU). The HMD displays an overlaid image that includes image content generated by the HMD camera and image content generated by an external camera. The overlaid image further includes a bounding element surrounding the image content generated by the external camera. The HMD modifies a position of the bounding element in the overlaid image based on a detected movement of one or both of the HMD camera and the external camera. The process of modifying the position is based on IMU data received from the HMD IMU and IMU data received from an external IMU associated with the external camera. The HMD acquires an HMD camera image from the HMD camera and acquires an external camera image from the external camera. In response to performing a visual alignment between the HMD camera image and the external camera image, the HMD computes an update vector indicating an amount by which the bounding element is to be moved to be at a correct position. Then, based on updated IMU data received from both the HMD IMU and the external IMU, the HMD determines an amount of relative movement that the HMD camera and the external camera are currently experiencing relative to one another. Based on the determined amount of relative movement, the HMD causes the bounding element to progressively transition to the correct position in the overlaid image based on the update vector. Beneficially, a speed by which the bounding element is progressively transitioned is proportional to the determined amount of relative movement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
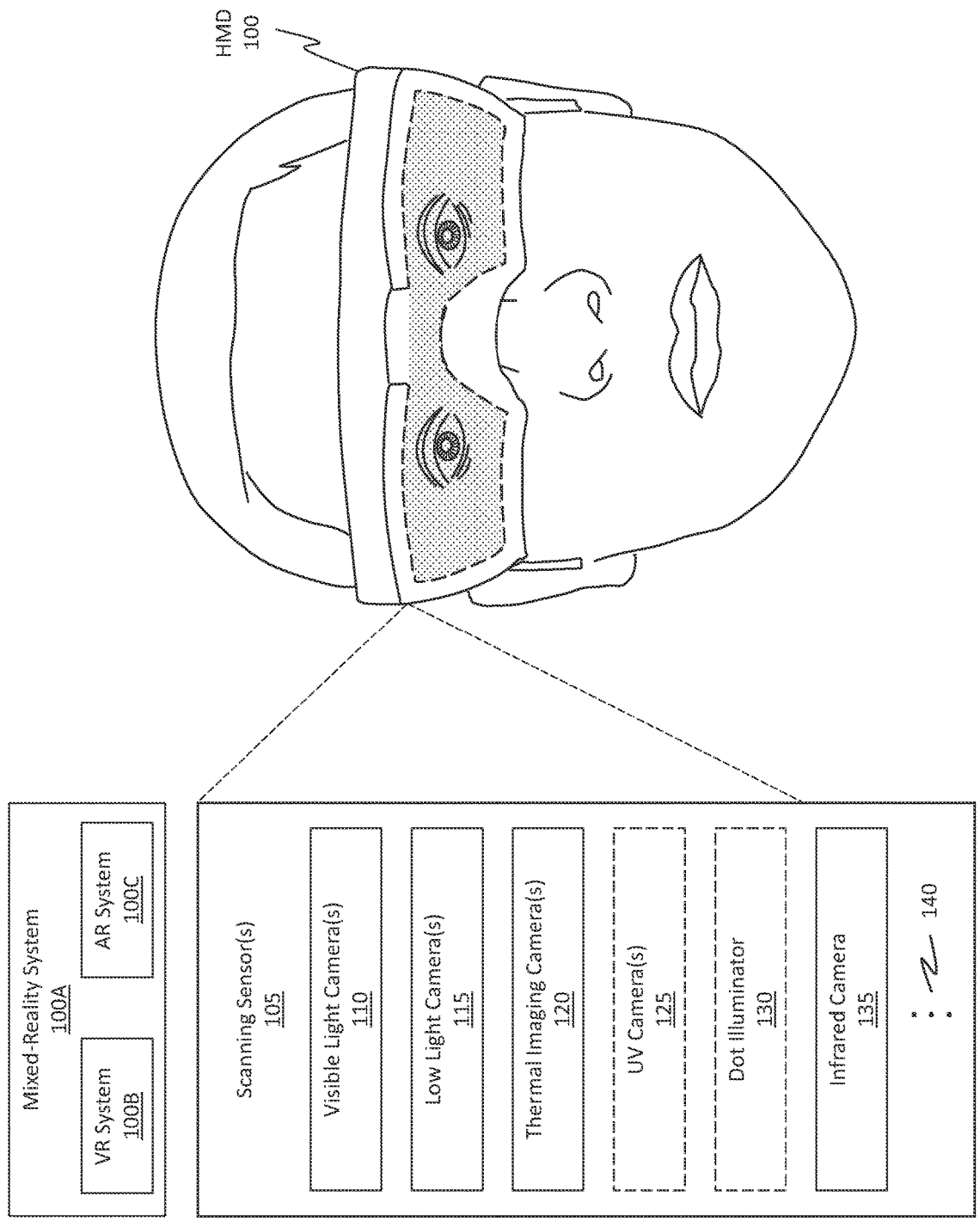
FIG. 1 illustrates an example head-mounted device (HMD) configured to perform the disclosed operations.

Embodiments disclosed herein relate to systems, devices (e.g., hardware storage devices, wearable devices, etc.), and methods for correcting an overlay misalignment between an external camera image and a system camera image. The embodiments are further configured to minimize observation of these corrections by scaling and performing the corrections based on certain detected movement conditions.

Some embodiments include a system camera and a system IMU. The embodiments acquire a first system camera image and a first external camera image. A first visual alignment is performed between those two images to produce an overlaid image. Some of the content in the overlaid image is surrounded by a bounding element. A position of the bounding element is modified based on movements of the system camera and/or the external camera. A second system camera image and a second external camera image are acquired. In response to performing a second visual alignment between those new images, the embodiments compute an update vector reflecting where the bounding element should currently be positioned or reflecting how much the bounding element should be moved in order to be at the correct position. The embodiments determine an amount of relative movement that the system camera and the external camera are currently experiencing relative to one another. Based on the movement, the embodiments cause the bounding element to progressively transition to the correct position in the overlaid image based on the update vector. A speed by which the bounding element is progressively transitioned is proportional to the amount of movement. In doing so, the embodiments are able to beneficially "hide" the corrections from observation by a user by performing those corrections during a movement event.

An HMD can include an HMD camera and an HMD IMU. The HMD displays an overlaid image that includes image content generated by the HMD camera and image content generated by an external camera. The overlaid image includes a bounding element surrounding the image content generated by the external camera. The HMD modifies a position of the bounding element based on detected movements of the HMD camera and the external camera using IMU data. The HMD acquires an HMD camera image from the HMD camera and acquires an external camera image from the external camera. In response to performing a visual alignment between those two images, the HMD determines that a current position of the bounding element is incorrect (e.g., by computing an update vector). Based on updated IMU data, the HMD determines an amount of relative movement that the HMD camera and the external camera are currently experiencing relative to one another. Based on the movement, the HMD causes the bounding element to progressively transition to a corrected position in the overlaid image based on the update vector. Beneficially, a speed by which the bounding element is progressively transitioned is proportional to the determined amount of relative movement.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

As described earlier, challenges occur when aligning image content from two different cameras. Generally, there are a few techniques that can be used to align images. One technique is referred to herein as a "visual alignment" technique. This technique involves identifying feature points in one image and corresponding feature points in another image. The technique then involves aligning the images using the common feature points as references. Another technique involves the use of IMU data to track and monitor how one camera shifts in pose and orientation relative to another camera (i.e. an "IMU-based" approach). The orientation models for the cameras can be modified based on the IMU data, and the resulting images can be reprojected in order to align with one another.

It is typically the case that IMU data is readily available, so performing the IMU-based correction is usually an option, but it is often less accurate than the visual alignment technique. The visual alignment technique, on the other hand, might not always be available. For instance, it is sometimes the case that a sufficient number of feature points are not detectable or that the lighting conditions are not adequate. What results then is a hybrid approach in which IMU data is relied on to perform the alignment when the visual alignment process is not available. Because the IMU-based approach is not as accurate, it is often the case that when the visual alignment process is eventually performed, that process reveals that the bubble is not actually at the correct position after the IMU-based approach was performed.

One option to fix the bubble position is to "snap" it into the correct position after performing the visual alignment technique. Users have complained, however, that this snapping effect leaves them disoriented and confused. What is needed, therefore, is an improved technique for correcting a bubble's position.

The disclosed embodiments provide solutions to these problems by minimizing the observable effects when correcting the bubble's position. Specifically, the embodiments are able to detect when the system camera and/or the external camera are moving. Because those cameras are moving, the bubble will also be moving. The embodiments are able to effectively "hide" the bubble-placement corrections in those bubble movements. Furthermore, the speed by which the corrections occur are proportional to the amount of movement that is occurring. If a larger amount of movement is happening, then a more dramatic or "faster" correction (i.e. relocation of the bubble) can occur. On the other hand, if a smaller amount of movement is happening, then a less dramatic or slower correction can occur. In performing these operations, the user's experience is significantly improved, thereby leading to an improvement in the technology. Improved image alignment and visualization are also achieved.

Beneficially, the disclosed embodiments can optionally avoid performing corrections when both cameras are held steady. This avoidance occurs because making corrections during such a scenario (i.e. steady) will likely be very noticeable/distracting to the user. As such, the embodiments can employ a level of intelligence as to when they will or will not apply corrections based on the state or movement conditions of the cameras. Accordingly, these and numerous other benefits will be described throughout the remaining portions of this disclosure.

Example MR Systems and HMDs

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
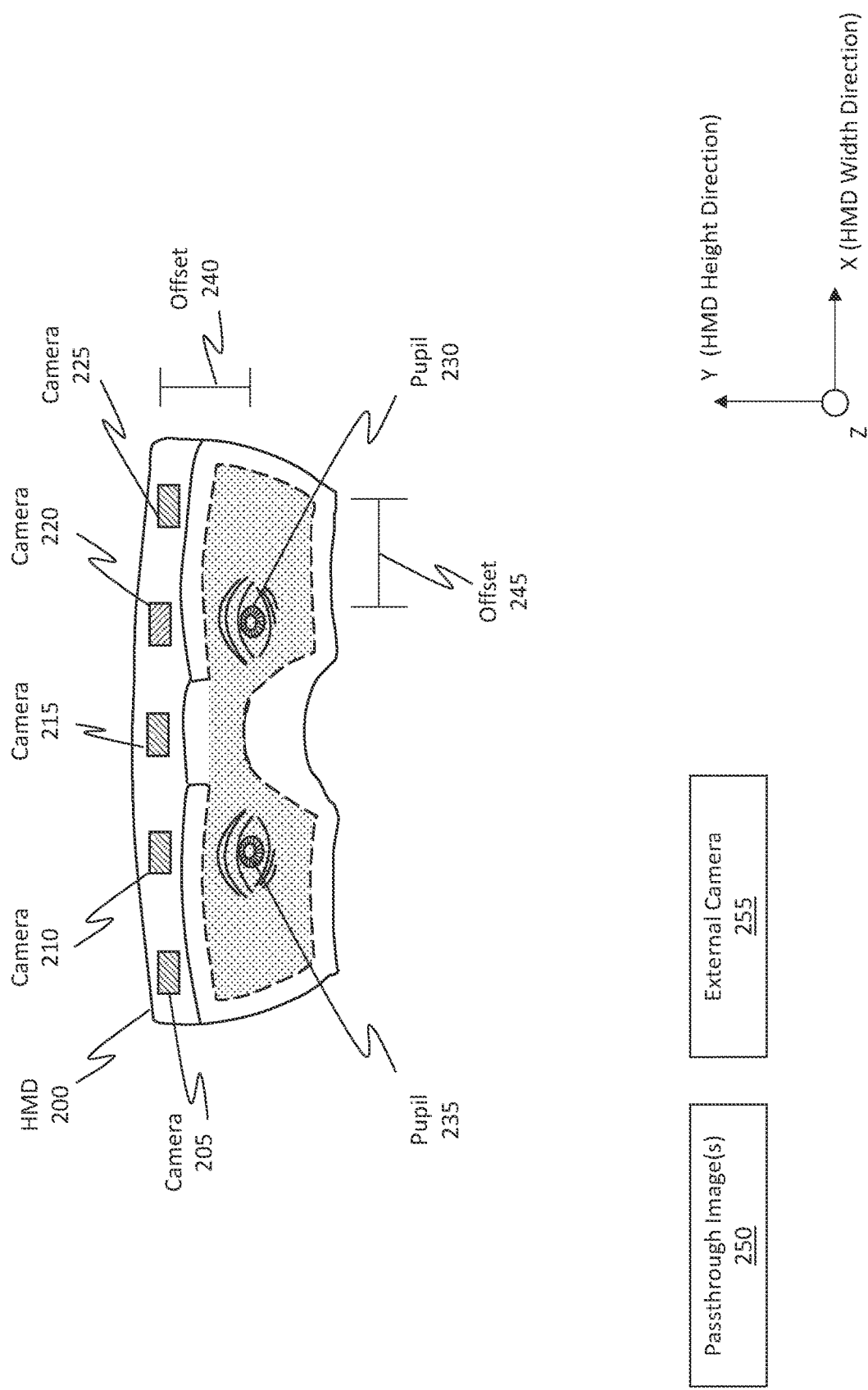
FIG. 2 illustrates another configuration of an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

In some cases, the cameras can be located at specific positions on the HMD 200. In some cases, a first camera (e.g., perhaps camera 220) is disposed on the HMD 200 at a position above a designated left eye position of a user who wears the HMD 200 relative to a height direction of the HMD. For example, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. With reference to FIG. 2, a camera may be physically disposed on the HMD 200 at a position in front of the pupil 230 in the z-axis direction.

When a second camera is provided (e.g., perhaps camera 210), the second camera may be disposed on the HMD 200 at a position above a designated right eye position of a user who wears the HMD relative to the height direction of the HMD. For example, the camera 210 is above the pupil 235. In some cases, the second camera is additionally positioned above the designated right eye position relative to the width direction of the HMD. When a VR system is used, a camera may be placed directly in front of the designated right eye position. With reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the view of the environment from the HMD's perspective. Cameras 205-225 are used to provide these passthrough image(s) 250. The offset (e.g., offset 240 and 245) between the cameras and the user's pupils results in parallax. In order to provide these passthrough image(s) 250, the embodiments can perform parallax correction by applying various transformations and reprojections on the images in order to change the initial perspective represented by an image into a perspective matches that of the user's pupils. Parallax correction relies on the use of a depth map in order to make the reprojections.

In some implementations, the embodiments utilize a planar reprojection process to correct parallax when generating the passthrough images as opposed to performing a full three-dimensional reprojection. Using this planar reprojection process is acceptable when objects in the environment are sufficiently far away from the HMD. Thus, in some cases, the embodiments are able to refrain from performing three-dimensional parallax correction because the objects in the environment are sufficiently far away and because that distance results in a negligible error with regard to depth visualizations or parallax issues.

Any of the cameras 205-225 constitute what is referred to as a "system camera" because they are integrated parts of the HMD 200. In contrast, the external camera 255 is physically separate and detached from the HMD 200 but can communicate wirelessly with the HMD 200. As will be described shortly, it is desirable to align images (or image content) generated by the external camera 255 with images (or image content) generated by a system camera to then generate an overlaid image, which can operate as a passthrough image. Often, the angular resolution of the external camera 255 is higher (i.e. more pixels per degree and not just more pixels) than the angular resolution of the system camera, so the resulting overlaid image provides enhanced image content beyond that which is available from using only the system camera image. Additionally, or alternatively, the modalities of the external camera 255 and the system camera may be different, so the resulting overlaid image can also include enhanced information. As an example, suppose the external camera 255 is a thermal imaging camera. The resulting overlaid image can, therefore, include visible light image content and thermal image content. Accordingly, providing an overlaid passthrough image is highly desirable. It should be noted that the external camera 255 may be any of the camera types listed earlier. Additionally, there may be any number of external cameras, without limit.

Example Scenarios

Figure 3:
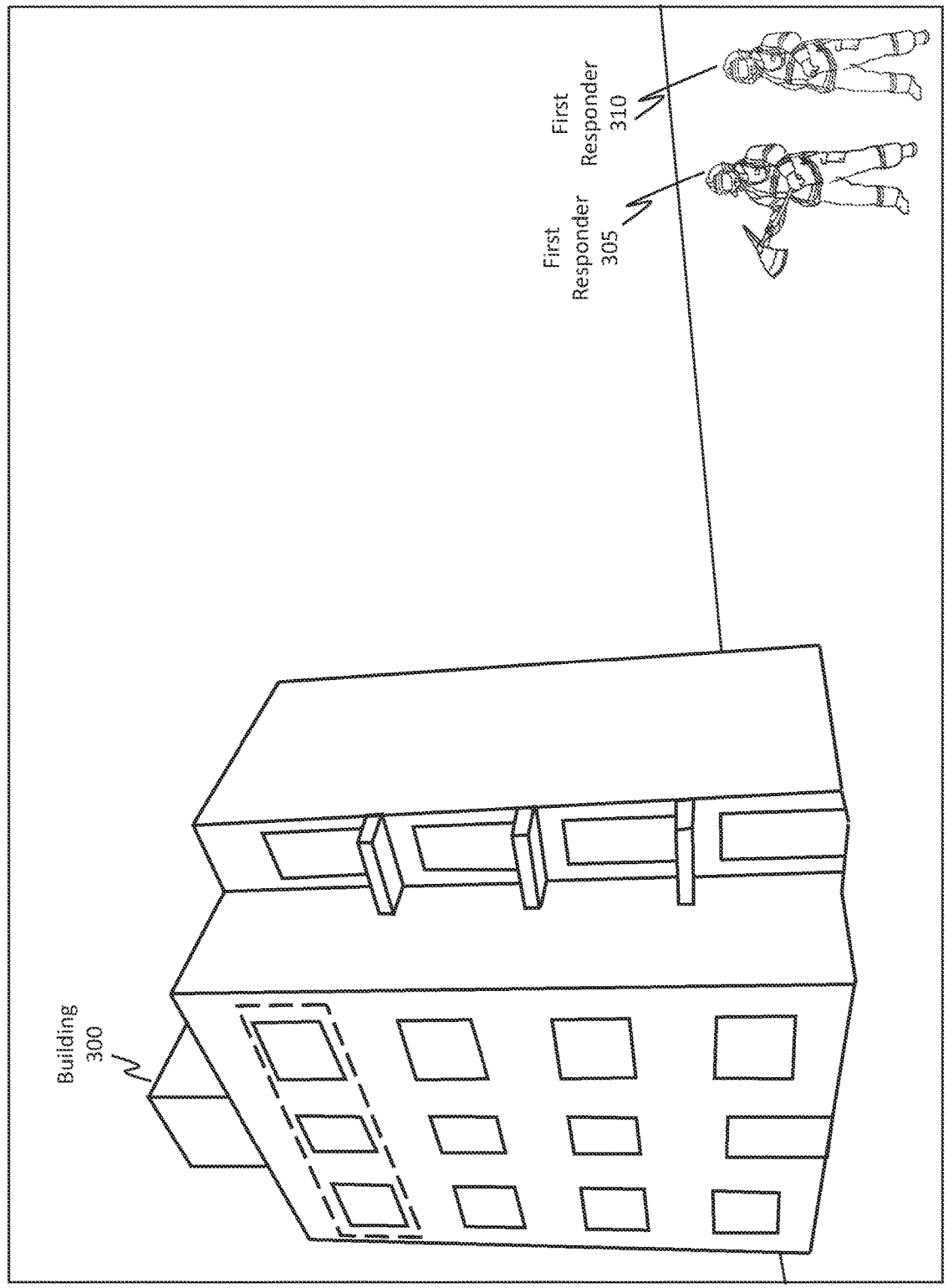
FIG. 3 illustrates an example scenario in which the disclosed principles may be practiced.
Figure 4:
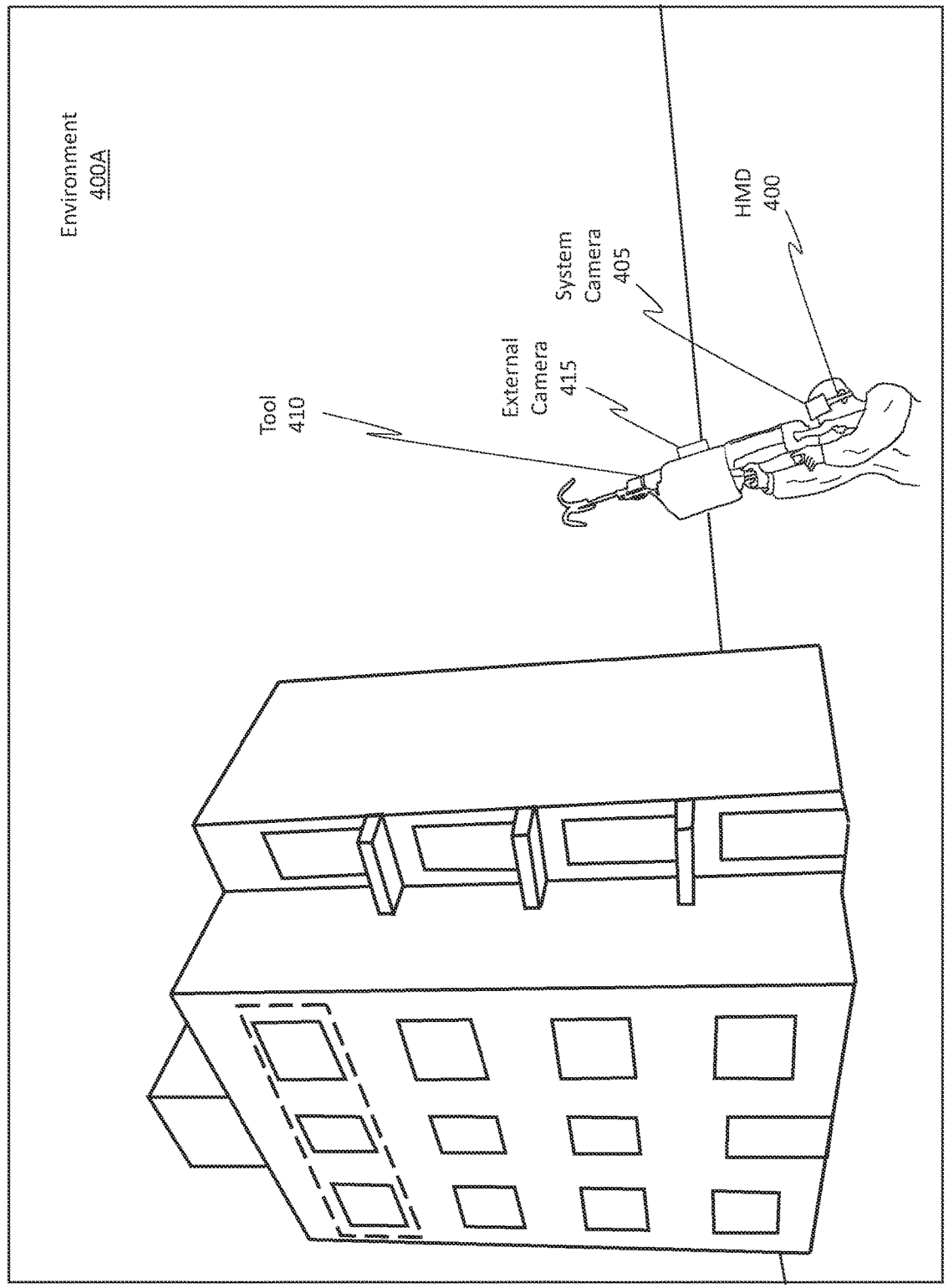
FIG. 4 illustrates another example scenario.

Attention will now be directed to FIG. 3, which illustrates an example scenario in which the HMDs discussed in FIGS. 1 and 2 may be used. FIG. 3 shows a building 300 and a first responder 305 and another first responder 310. In this example scenario, the first responders 305 and 310 are desirous to scale the building 300. FIG. 4 shows one example technique for performing this scaling feat.

FIG. 4 shows a first responder wearing an HMD 400, which is representative of the HMDs discussed thus far, in an environment 400A. HMD 400 includes a system camera 405, as discussed previously. Furthermore, the first responder is using a tool 410 that includes an external camera 415, which is representative of the external camera 255 of FIG. 2. In this case, the tool 410 is a grappling gun that will be used to shoot a rope and hook onto the building to allow the first responder to scale the building. By aligning the image content generated by the external camera 415 with the image content generated by the system camera 405, the user will be able to better discern where the tool 410 is being aimed.

Figure 5:
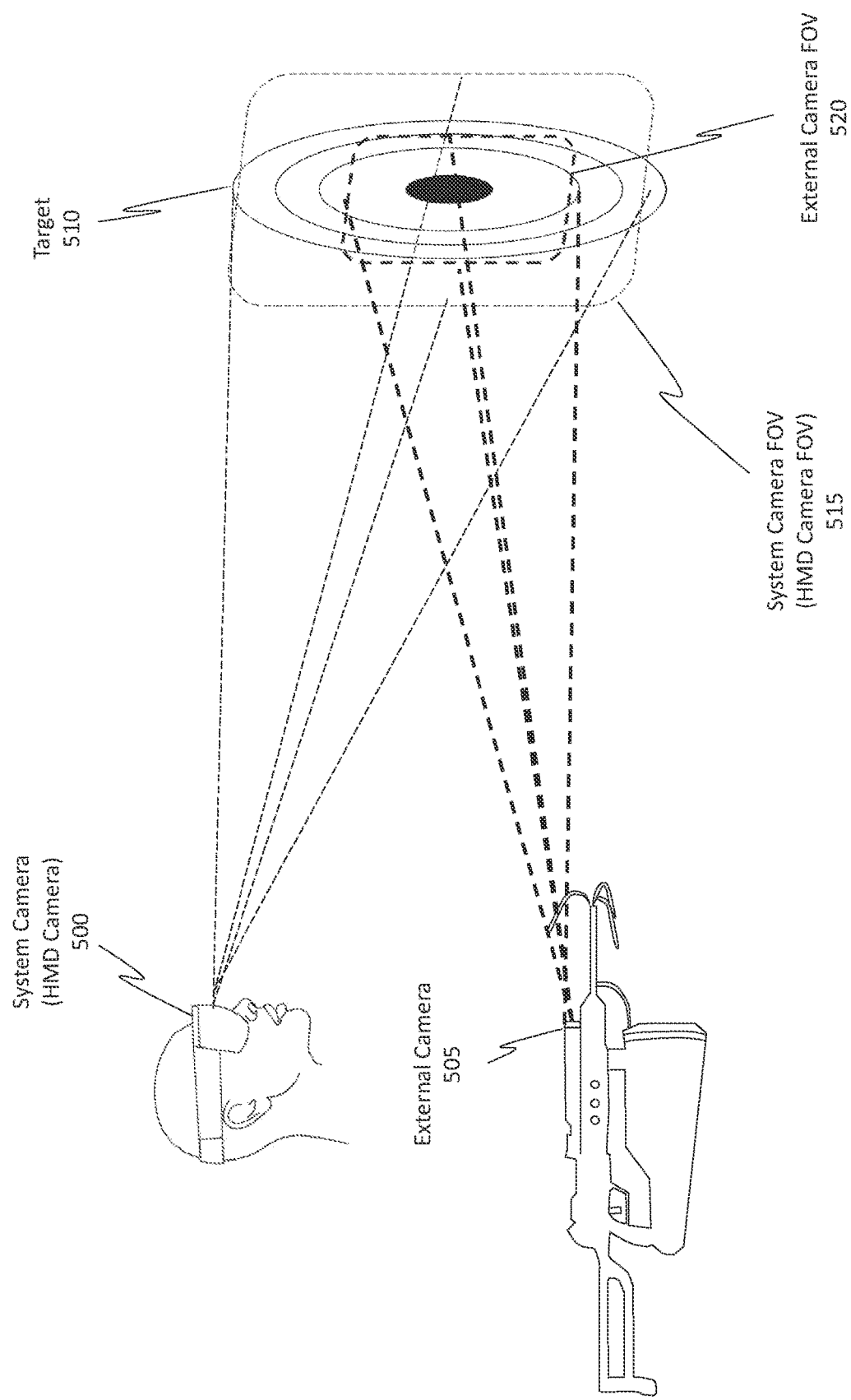
FIG. 5 illustrates how a system camera and an external camera can be used to perform the disclosed operations.

That is, in accordance with the disclosed principles, it is desirable to provide an improved platform or technique by which a user (e.g., the first responders) can aim a tool (e.g., the tool 410) using the HMD 400, the system camera 405, and the external camera 415 as a combined aiming interface. FIG. 5 shows one such example.

FIG. 5 shows a system camera 500 (aka HMD camera) mounted on an HMD, where the system camera 500 is representative of the system camera 405 of FIG. 4, and a tool (e.g., a grappling gun) that includes an external camera 505, which is representative of the external camera 415. It should be noted how the optical axis of the external camera 505 is aligned with the aiming direction of the tool. As a consequence, the images generated by the external camera 505 can be used to determine where the tool is being aimed. One will appreciate how the tool can be any type of aimable tool, without limit.

In FIG. 5, both the system camera 500 and the external camera 505 are being aimed at a target 510. To illustrate, the field of view (FOV) of the system camera 500 is represented by the system camera FOV 515 (aka HMD camera FOV), and the FOV of the external camera 505 is represented by the external camera FOV 520. Notice, the system camera FOV 515 is larger than the external camera FOV 520. Typically, the external camera 505 provides a very focused view, similar to that of a scope (i.e. a high level of angular resolution). As will be discussed in more detail later, the external camera 505 sacrifices a wide FOV for an increased resolution and increased pixel density. Accordingly, in this example scenario, one can observe how in at least some situations, the external camera FOV 520 may be entirely overlapped or encompassed by the system camera FOV 515. Of course, in the event the user aims the external camera 505 in a direction where the system camera 500 is not aimed at, then the system camera FOV 515 and the external camera FOV 520 will not overlap.

Figure 6:
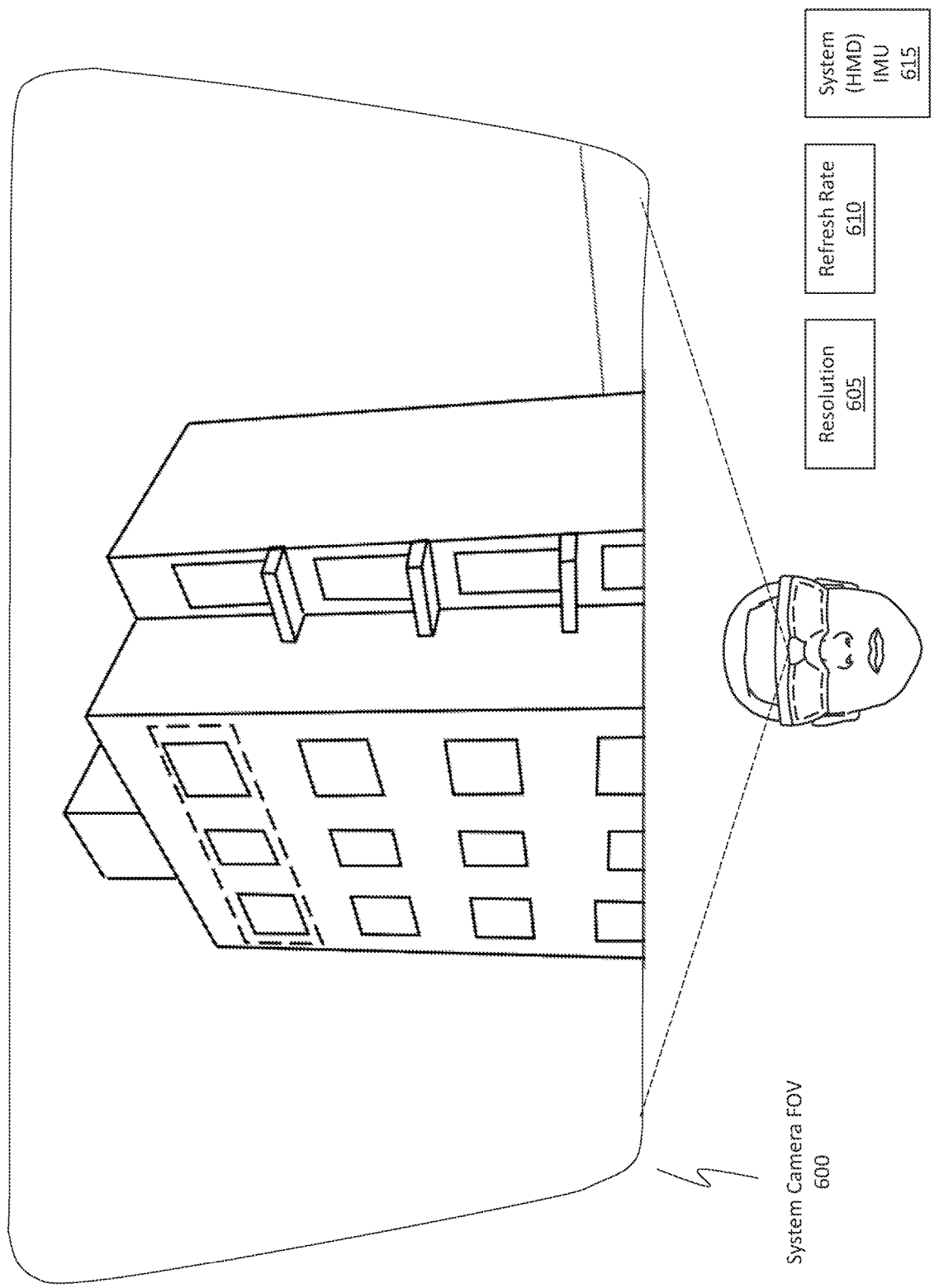
FIG. 6 illustrates the field of view (FOV) of a system camera.

FIG. 6 shows the system camera FOV 600, which is representative of the system camera FOV 515 of FIG. 5. The system camera FOV 600 will be captured by the system camera in the form of a system camera image and will potentially be displayed in the form of a passthrough image. The system camera images have a resolution 605 and are captured by the system camera based on a determined refresh rate 610 of the system camera. The refresh rate 610 of the system camera is typically between about 30 Hz and 120 Hz. Often, the refresh rate 610 is around 90 Hz or at least 60 Hz. Often, the system camera FOV 600 has at least a 55 degree horizontal FOV. The horizontal baseline of the system camera FOV 600 may extend to 65 degrees, or even beyond 65 degrees.

It should also be noted how the HMD includes a system (HMD) inertial measurement unit IMU 615. An IMU (e.g., system IMU 615) is a type of device that measures forces, angular rates, and orientations of a body. An IMU can use a combination of accelerometers, magnetometers, and gyroscopes to detect these forces. Because both the system camera and the system IMU 615 are integrated with the HMD, the system IMU 615 can be used to determine the orientation or pose of the system camera (and the HMD) as well as any forces the system camera is being subjected to.

In some cases, the "pose" may include information detailing the 6 degrees of freedom, or "6 DOF," information. Generally, the 6 DOF pose refers to the movement or position of an object in three-dimensional space. The 6 DOF pose includes surge (i.e. forward and backward in the x-axis direction), heave (i.e. up and down in the z-axis direction), and sway (i.e. left and right in the y-axis direction). In this regard, 6 DOF pose refers to the combination of 3 translations and 3 rotations. Any possible movement of a body can be expressed using the 6 DOF pose.

In some cases, the pose may include information detailing the 3 DOF pose. Generally, the 3 DOF pose refers to tracking rotational motion only, such as pitch (i.e. the transverse axis), yaw (i.e. the normal axis), and roll (i.e. the longitudinal axis). The 3 DOF pose allows the HMD to track rotational motion but not translational movement of itself and of the system camera. As a further explanation, the 3 DOF pose allows the HMD to determine whether a user (who is wearing the HMD) is looking left or right, whether the user is rotating his/her head up or down, or whether the user is pivoting left or right. In contrast to the 6 DOF pose, when 3 DOF pose is used, the HMD is not able to determine whether the user (or system camera) has moved in a translational manner, such as by moving to a new location in the environment.

Determining the 6 DOF pose and the 3 DOF pose can be performed using inbuilt sensors, such as accelerometers, gyroscopes, and magnetometers (i.e. the system IMU 615). Determining the 6 DOF pose can also be performed using positional tracking sensors, such as head tracking sensors. Accordingly, the system IMU 615 can be used to determine the pose of the HMD.

Figure 7:
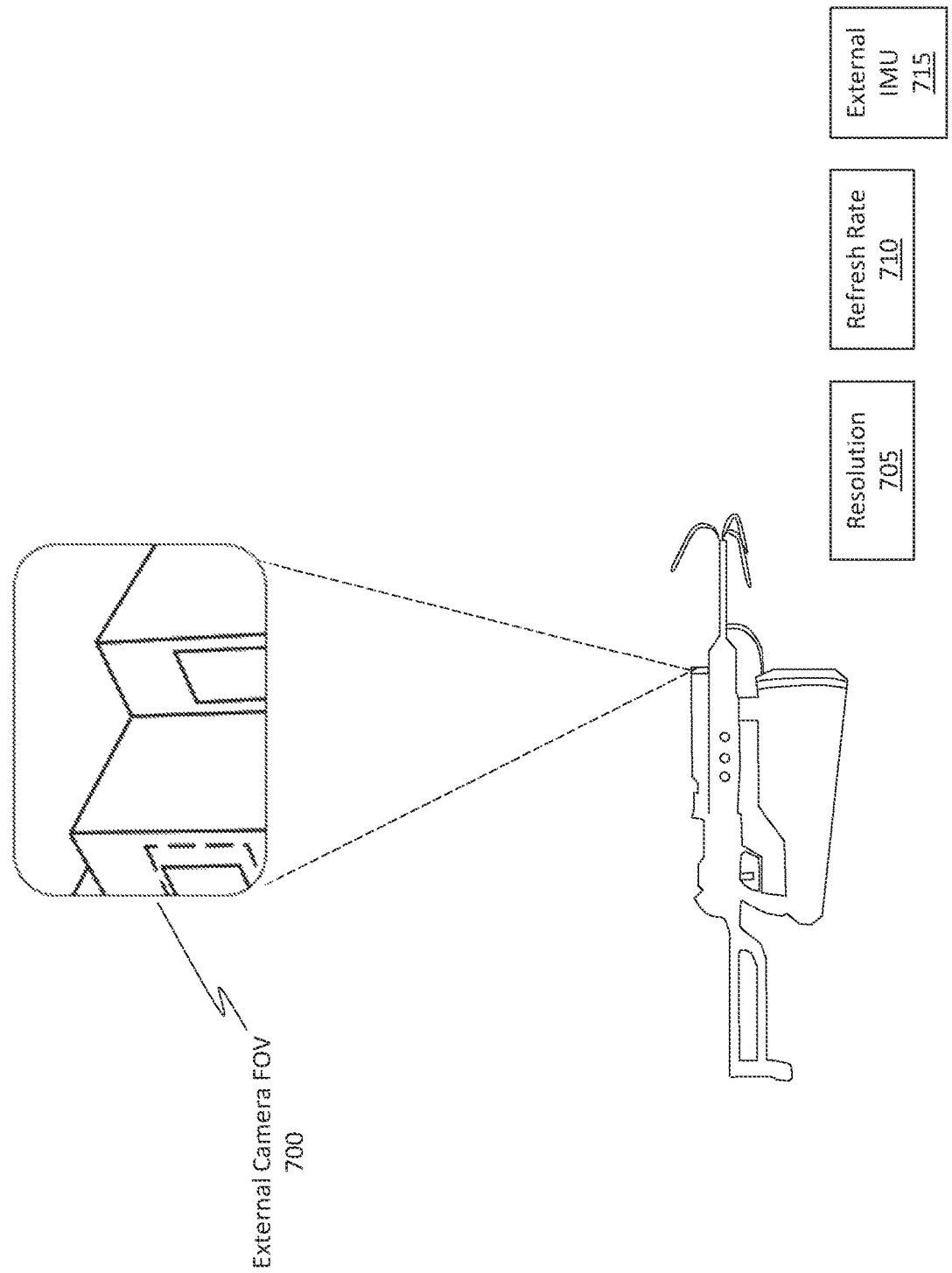
FIG. 7 illustrates the FOV of an external camera.

FIG. 7 shows an external camera FOV 700, which is representative of the external camera FOV 520 of FIG. 5. Notice, the external camera FOV 700 is smaller than the system camera FOV 600. That is, the angular resolution of the external camera FOV 700 is higher than the angular resolution of the system camera FOV 600. Having an increased angular resolution also results in the pixel density of an external camera image being higher than the pixel density of a system camera image. For instance, the pixel density of an external camera image is often 2.5 to 3 times that of the pixel density of a system camera image. As a consequence, the resolution 705 of an external camera image is higher than the resolution 605. Often, the external camera FOV 700 has at least a 19 degree horizontal FOV. That horizontal baseline may be higher, such as 20 degrees, 25 degrees, 30 degrees, or more than 30 degrees.

The external camera also has a refresh rate 710. The refresh rate 710 is typically lower than the refresh rate 610. For example, the refresh rate 710 of the external camera is often between 20 Hz and 60 Hz. Typically, the refresh rate 710 is at least about 30 Hz. The refresh rate of the system camera is often different than the refresh rate of the external camera. In some cases, however, the two refresh rates may be substantially the same.

The external camera also includes or is associated with an external IMU 715. Using this external IMU 715, the embodiments are able to detect or determine the orientation/pose of the external camera as well as any forces that the external camera is being subjected to. Accordingly, similar to the earlier discussion, the external IMU 715 can be used to determine the pose (e.g., 6 DOF and/or 3 DOF) of the external camera sight.

In accordance with the disclosed principles, it is desirable to overlap and align the images obtained from the external camera with the images generated by the system camera to generate an overlaid and aligned passthrough image. The overlap between the two images enables the embodiments to generate multiple images and then overlay image content from one image onto another image in order to generate a composite image or an overlaid image having enhanced features that would not be present if only a single image were used. As one example, the system camera image provides a broad FOV while the external camera image provides high resolution and pixel density for a focused area (i.e. the aiming area where the tool is being aimed). By combining the two images, the resulting image will have the benefits of a broad FOV and a high pixel density for the aiming area.

It should be noted that while this disclosure primarily focuses on the use of two images (e.g., the system camera image and the external camera image), the embodiments are able to align content from more than two images having overlapping regions. For instance, suppose 2, 3, 4, 5, 6, 7, 8, 9, or even 10 integrated and/or detached cameras have overlapping FOVs. The embodiments are able to examine each resulting image and then align specific portions with one another. The resulting overlaid image may then be a composite image formed from any combination or alignment of the available images (e.g., even 10 or more images, if available). Accordingly, the embodiments are able to utilize any number of images when performing the disclosed operations and are not limited to only two images or two cameras.

Figure 8:
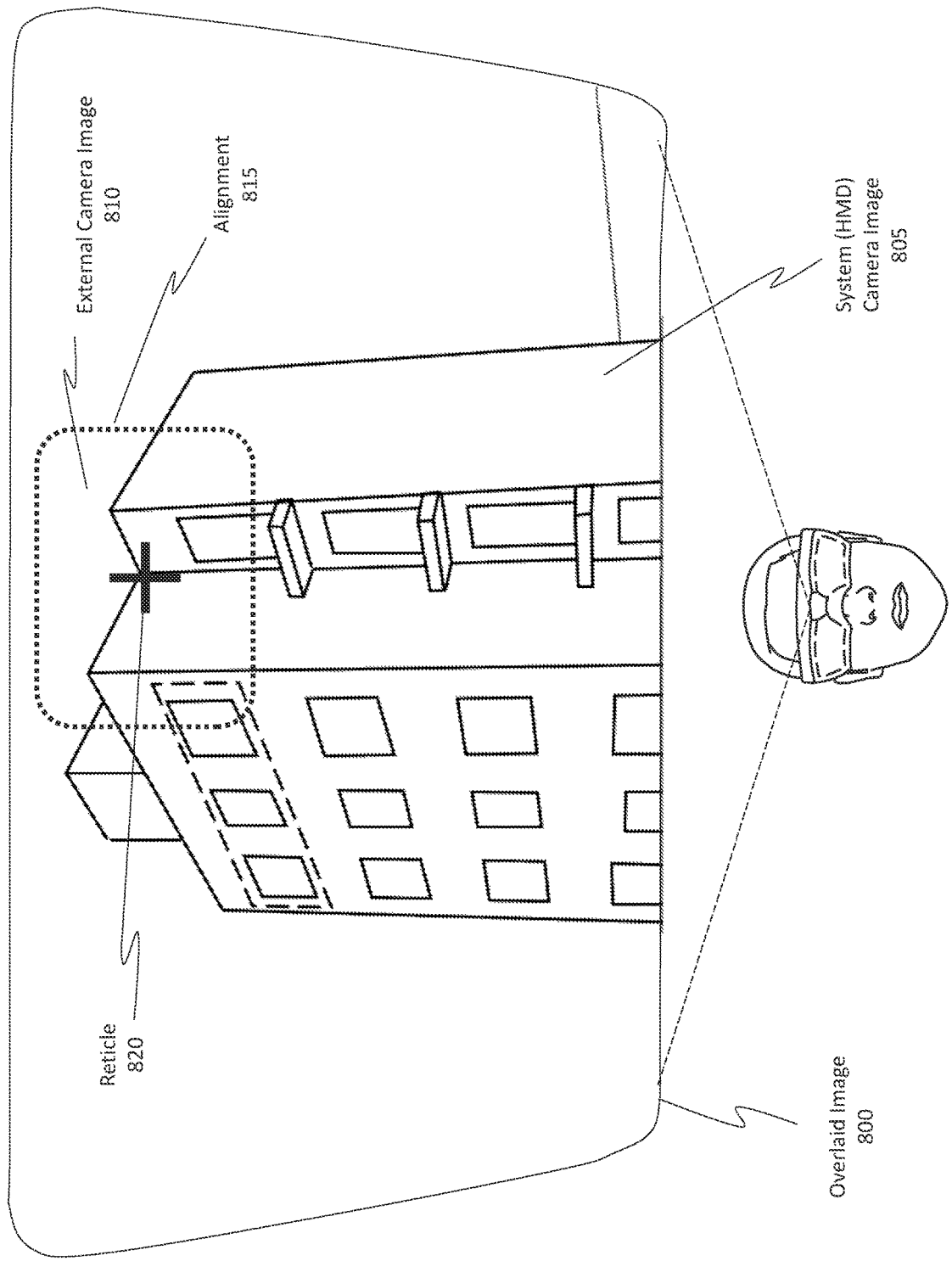
FIG. 8 illustrates an overlaid and aligned image in which image content from the external camera image is overlaid onto the system camera image.

As another example, suppose the system camera is a low light camera and further suppose the external camera is a thermal imaging camera. As will be discussed in more detail later, the embodiments are able to selectively extract image content from the thermal imaging camera image and overlay that image content onto the low light camera image. In this regard, the thermal imaging content can be used to augment or supplement the low light image content, thereby providing enhanced imagery to the user. Additionally, because the external camera has increased resolution relative to the system camera, the resulting overlaid image will provide enhanced clarity for the areas where the pixels in the external camera image are overlaid onto the system camera image. FIG. 8 provides an example of these operations and benefits.

Image Correspondences and Alignment

In accordance with the disclosed principles, the embodiments are able to align the system camera's image with the external camera's image. That is, because at least a portion of the two cameras' FOVs overlap with one another, as was described earlier, at least a portion of the resulting images include corresponding content. Consequently, that corresponding content can be identified and then a merged, fused, or overlaid image can be generated based on the similar corresponding content. By generating this overlaid image, the embodiments are able to provide enhanced image content to the user, which enhanced image content would not be available if only a single image type were provided to a user. Both the system camera's image and the external camera's images may be referred to as "texture" images.

As described earlier, different techniques can be used to perform the alignment. One technique is the "visual alignment" technique involving the detection of feature points. Another technique is the IMU-based technique that aligns images based on determined poses of the respective cameras. The visual alignment technique usually produces more accurate results.

More particularly, to merge or align the images, the embodiments are able to analyze the texture images (e.g., perform computer vision feature detection) in an attempt to find any number of feature points. As used herein, the phrase "feature detection" generally refers to the process of computing image abstractions and then determining whether an image feature (e.g., of a particular type) is present at any particular point or pixel in the image. Often, corners (e.g., the corners of a wall), distinguishable edges (e.g., the edge of a table), or ridges are used as feature points because of the inherent or sharp contrasting visualization of an edge or corner.

Any type of feature detector may be programmed to identify feature points. In some cases, the feature detector may be a machine learning algorithm. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In accordance with the disclosed principles, the embodiments detect any number of feature points (e.g., 1, 2, 3, 4, 5, 6, 7, 8, 9, 10, 20, 30, 40, 50, 60, 70, 80, 90, 100, 200, 500, 1,000, 2,000, or more than 2,000) and then attempt to identify correlations or correspondences between the feature points detected in the system camera image and the feature points identified in the external camera image.

Some embodiments then fit the feature or image correspondence(s) to a motion model in order to overlay one image onto another image to form an enhanced overlaid image. Any type of motion model may be used. Generally, a motion model is a type of transformation matrix that enables a model, a known scene, or an object to be projected onto a different model, scene, or object.

In some cases, the motion model may simply be a rotational motion model. With a rotational model, the embodiments are able to shift one image by any number of pixels (e.g., perhaps 5 pixels to the left and 10 pixels up) in order to overlay one image onto another image. For instance, once the image correspondences are identified, the embodiments can identify the pixel coordinates of those feature points or correspondences. Once the coordinates are identified, then the embodiments can overlay the external camera sight's image onto the HMD camera's image using the rotational motion model approach described above.

In some cases, the motion model may be more complex, such as in the form of a similarity transform model. The similarity transform model may be configured to allow for (i) rotation of either one of the HMD camera's image or the external camera sight's image, (ii) scaling of those images, or (iii) homographic transformations of those images. In this regard, the similarity transform model approach may be used to overlay image content from one image onto another image. Accordingly, in some cases, the process of aligning the external camera image with the system camera image is performed by (i) identifying image correspondences between the images and then, (ii) based on the identified image correspondences, fitting the correspondences to a motion model such that the external camera image is projected onto the system camera image.

Another technique for aligning images includes using IMU data to predict poses of the system camera and the external camera. Once the two poses are estimated or determined, the embodiments then use those poses to align one or more portions of the images with one another. Once aligned, then one or more portions of one image (which portions are the aligned portions) are overlaid onto the corresponding portions of the other image in order to generate an enhanced overlaid image. In this regard, IMUS can be used to determine poses of the corresponding cameras, and those poses can then be used to perform the alignment processes. IMU data is almost always readily available. Sometimes, however, the visual alignment process might not be able to be performed.

FIG. 8 shows a resulting overlaid image 800 comprising portions (or all) of a system (HMD) camera image 805 (i.e. an image generated by the system camera) and an external camera image 810 (i.e. an image generated by the external camera). These images are aligned using an alignment 815 process (e.g., visual alignment and/or IMU-based alignment). Optionally, additional image artifacts can be included in the overlaid image 800, such as perhaps a reticle 820 used to help the user aim the tool. By aligning the image content, a user of the tool can determine where the tool is being aimed without having to look down the tool's sights. Instead, the user can discern where the tool is being aimed by simply looking at the content displayed in his/her HMD.

Figure 9:
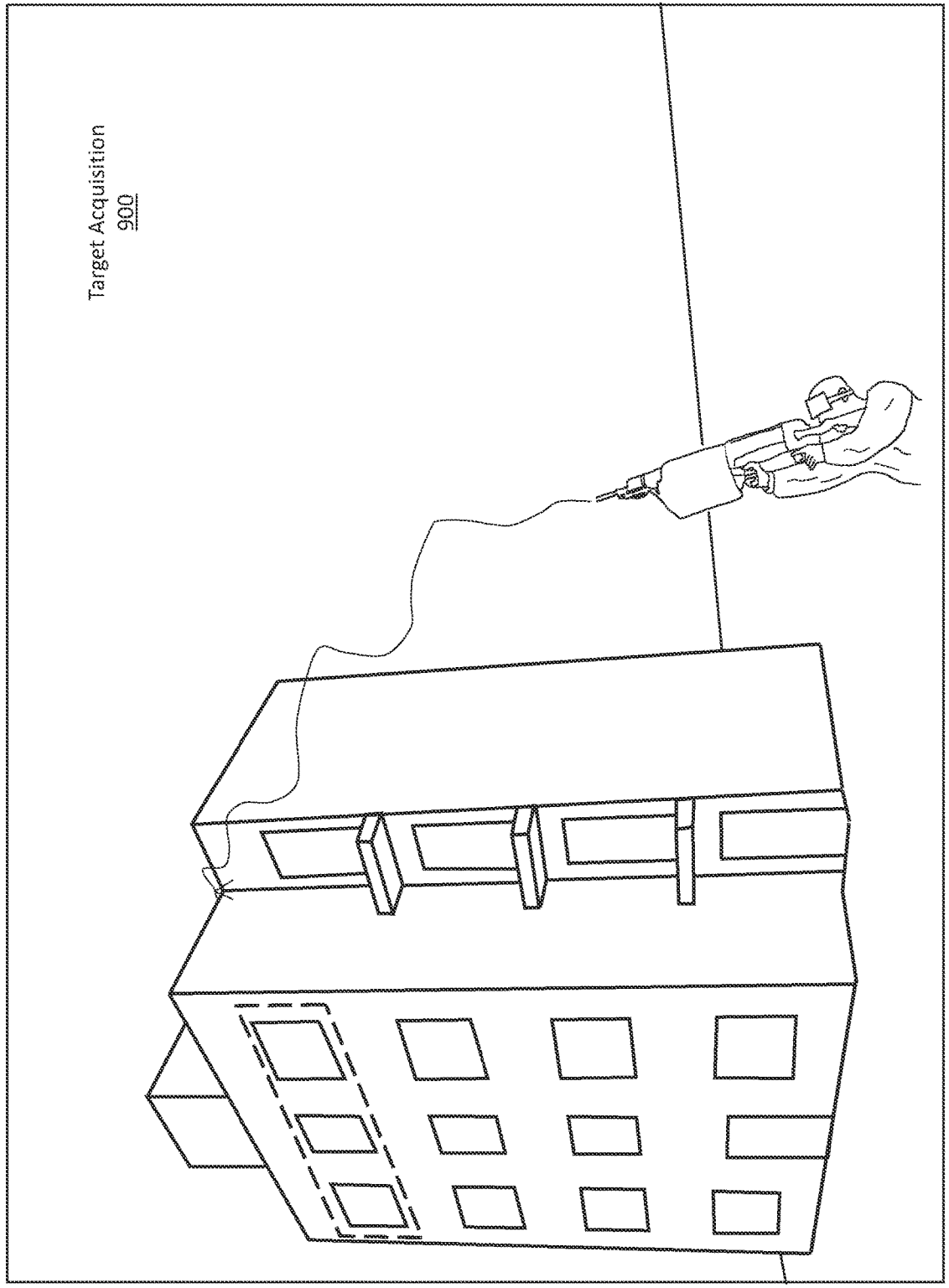
FIG. 9 illustrates another example scenario in which the principles may be practiced.

Providing the enhanced overlaid image 800 allows for rapid target acquisition, as shown by target acquisition 900 in FIG. 9. That is, a target can be acquired (i.e. the tool is accurately aimed at a desired target) in a fast manner because the user no longer has to take time to look through the tool's sights.

Improved Image Alignment in Response to Camera Movement

Figure 10:
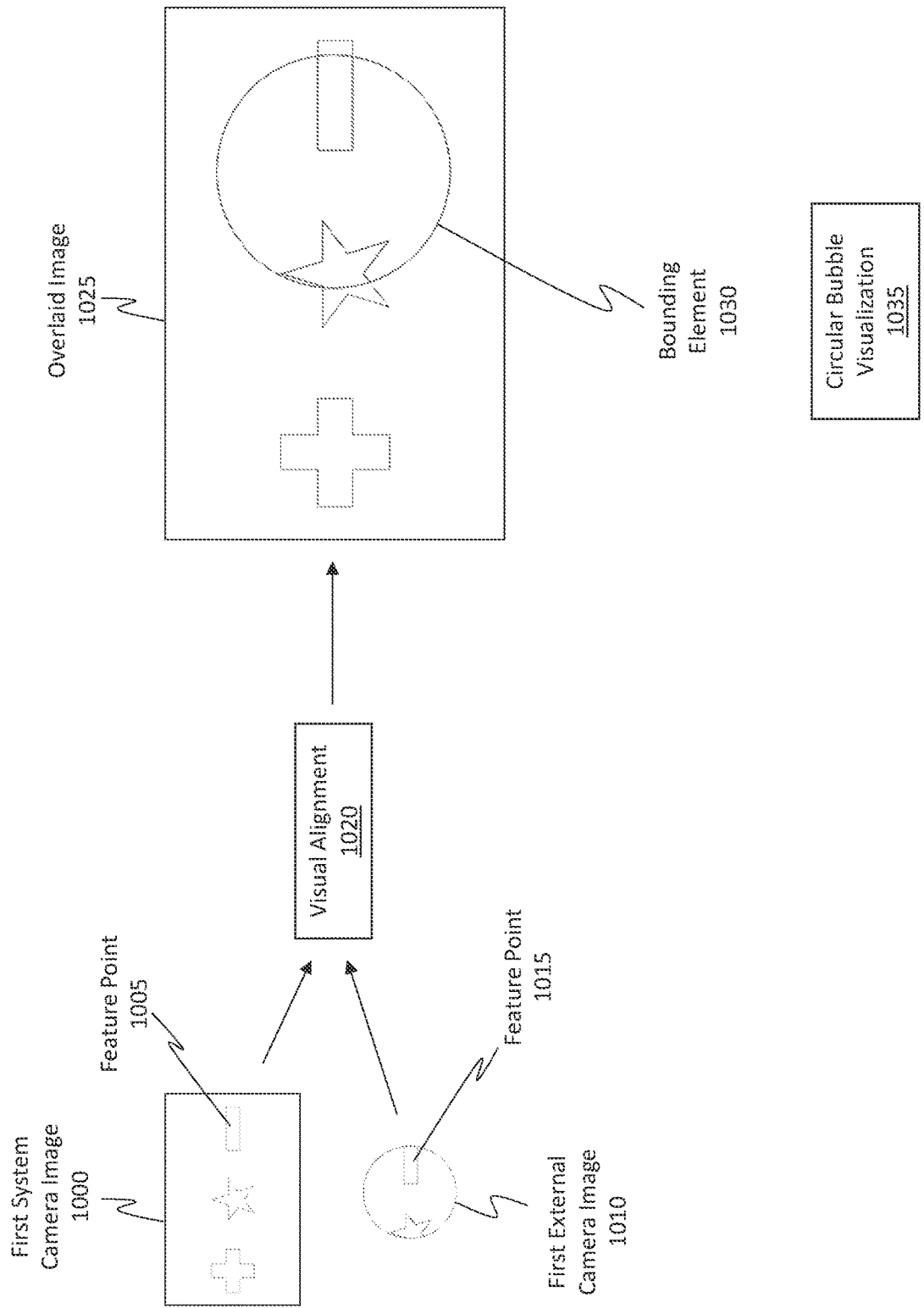
FIG. 10 illustrates how an external camera image can be overlaid onto a system camera image using a first visual alignment process and how a bounding element can be displayed in a manner so as to surround the content from the external camera image.

FIG. 10 shows an abstracted version of the images discussed thus far. In particular, FIG. 10 shows a first system camera image 1000 having a feature point 1005 and a first external camera image 1010 having a feature point 1015 that corresponds to the feature point 1005. The embodiments are able to perform a visual alignment 1020 between the first system camera image 1000 and the first external camera image 1010 using the feature points 1005 and 1015 in order to produce the overlaid image 1025. The overlaid image 1025 includes portions extracted or obtained from the first system camera image 1000 and portions extracted or obtained from the first external camera image 1010. Notice, in some embodiments, the overlaid image 1025 includes a bounding element 1030 encompassing pixels that are obtained from the first external camera image 1010 and/or from the first system camera image 1000. Optionally, the bounding element 1030 may be in the form of a circular bubble visualization 1035. Other shapes may be used for the bounding element 1030, however.

Figure 11:
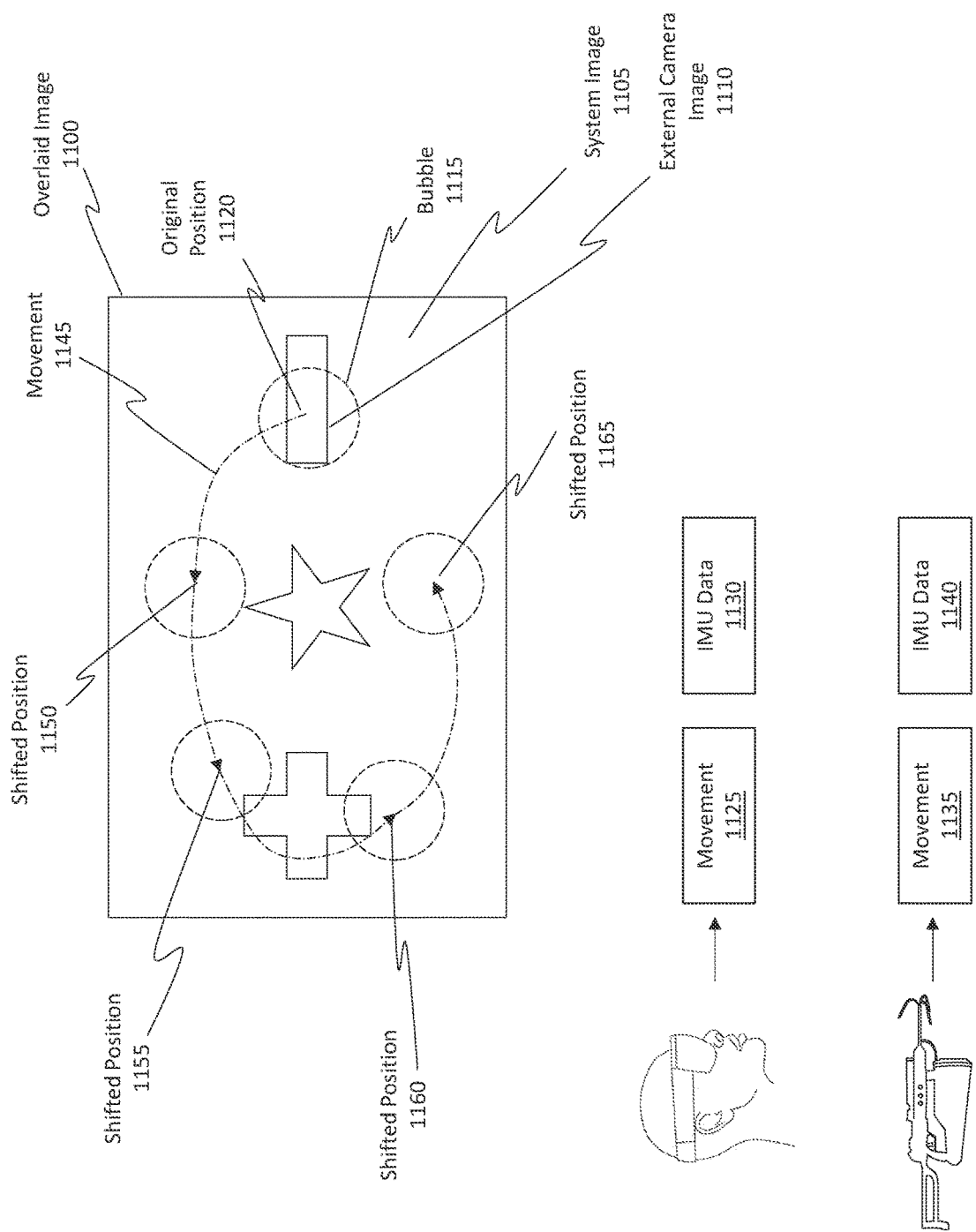
FIG. 11 illustrates how, during time periods where visual alignment processes are not performed (e.g., perhaps because an insufficient number of feature points were detected to perform visual alignment, perhaps because of insufficient lighting conditions, etc.), IMUs can be used to track movements of the system camera and/or the external camera in order to align content and in order to shift the position of the bounding element.

When the visual alignment process is not available, the embodiments can perform the IMU-based alignment process. FIG. 11 is representative.

FIG. 11 shows an overlaid image 1100, which is representative of the overlaid image 1025 from FIG. 10. For instance, it may be the case that at a first point in time, the embodiments performed the visual alignment technique. Thereafter (at least for a period of time), the embodiments performed the IMU-based technique, as shown in FIG. 11.

FIG. 11 shows how the overlaid image 1100 is formed from a system image 1105 and an external camera image

1110. The overlaid image 1100 also includes a bubble 1115 surrounding the content from the external camera image 1110. Notice, the bubble 1115 has an original position 1120. Based on movements of the HMD (e.g., movement 1125), which movements are detected by IMU data 1130 from the HMD's IMU, and based on movements of the external camera (e.g., movement 1135), which are detected by IMU data 1140 from the external camera's IMU, the embodiments are able to shift or relocate the bubble to new positions to reflect the movements of the HMD and external camera.

For instance, over a given period of time, there is relative movement 1145 between the HMD and the external camera, resulting in the bubble 1115 relocating to new positions, such as shifted position 1150 at one point in time, shifted position 1155 at another point in time, shifted position 1160 at another point in time, and shifted position 1165 at another point in time. These shifted positions were determined using the IMU data 1130 and 1140.

Figure 12A:
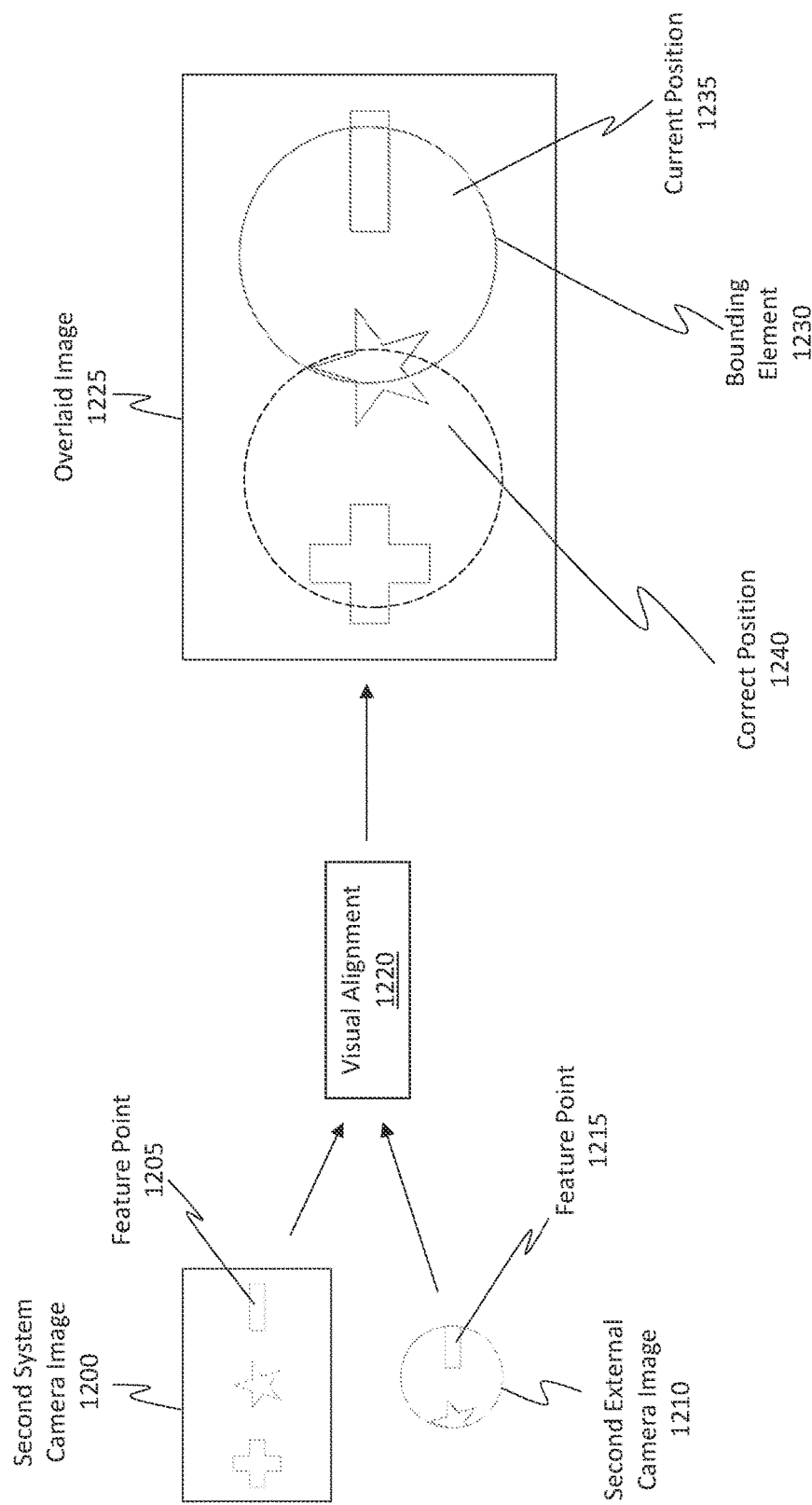
FIG. 12A illustrates how a second visual alignment process can occur.

At another point in time, the option to perform visual alignment is now available (e.g., perhaps now a sufficient number of feature points are detectable). FIG. 12A shows a second visual alignment process, which is performed after the IMU-based process in FIG. 11 and after the first visual alignment process shown in FIG. 10.

Specifically, FIG. 12A shows a second system camera image 1200, which has a feature point 1205, and a second external camera image 1210, which has a corresponding feature point 1215. These images are used to perform a second visual alignment 1220 to generate an overlaid image 1225. The embodiments are aware as to the previous location of the bounding element, as that location was determined using the IMU data and processes described in FIG. 11. That is, the bounding element 1230 is shown as having a current position 1235, which is a position determined using the IMU data. Based on the results of the visual alignment 1220, however, the bounding element should actually be at a different location, namely, the correct position 1240. It is desirable to shift or transition the bounding element 1230 from the current position 1235 to the correct position 1240. Notably, it is also desirable to perform this shift in a progressive and smooth manner as opposed to an abrupt or sudden snap-like manner.

Figure 12B:
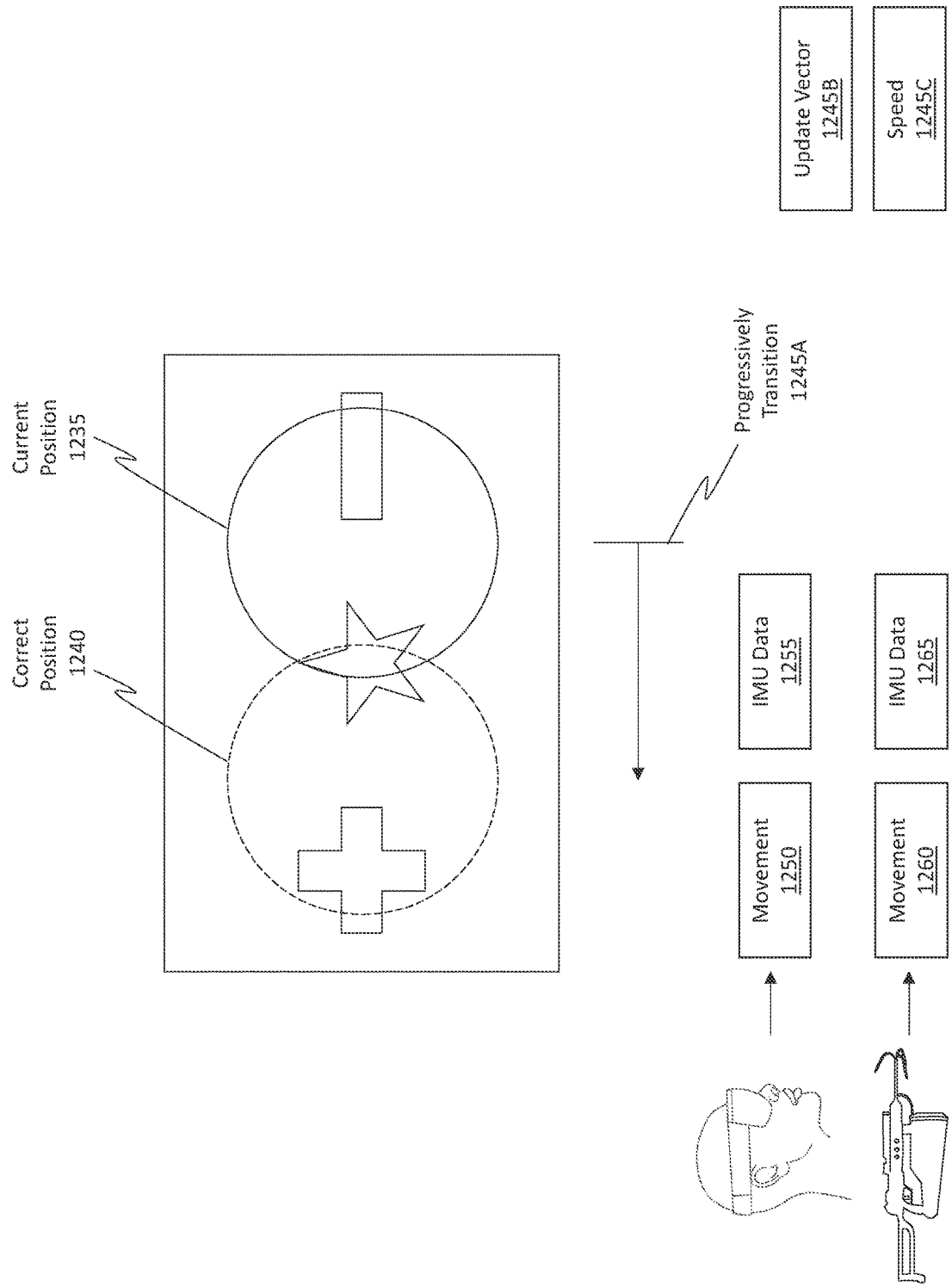
FIG. 12B illustrates how the visual alignment process can detect an error in the position of the bounding element, where this error occurred as a result of previously using IMU data to shift the bounding element. Based on the results of the visual alignment, the embodiments can progressively transition the bounding element to a correct position.

To facilitate a smooth transition or correction, the embodiments effectively "hide" the correction when movement of the HMD and/or external camera is detected. FIG. 12B shows the current position 1235 and the correct position 1240 of the bubble. It is desirable to progressively transition 1245A the bubble from the current position 1235 to the correct position 1240 based on a determined update vector 1245B, where the speed 1245C of that progressive transition is dependent on an amount of movement that the HMD and/or external camera are currently experiencing relative to one another. The update vector 1245B can reflect a relative amount by which the bounding element should move in order to be at a correct position or, alternatively, the update vector 1245B can reflect an absolute position where the bounding element should be located. Based on the absolute position, the embodiments can then compute the amount of movement that would be needed to move the bounding element.

That is, the embodiments are able to detect a movement 1250 of the HMD using IMU data 1255 produced by the system IMU and detect a movement 1260 of the external camera using IMU data 1265 produced by the external IMU associated with the external camera. From the IMU data 1255 and 1265, the embodiments are able to determine the amount of relative movement that is occurring. When a relatively higher amount of relative movement is detected, the speed 1245C of the transition is increased (i.e. the speed by which the bubble shifts from the current position 1235 to the correct position 1240 is increased). When a relatively lower amount of relative movement is detected, the speed 1245C of the transition is decreased (i.e. the speed by which the bubble shifts from the current position 1235 to the correct position 1240 is decreased).

Figure 12C:
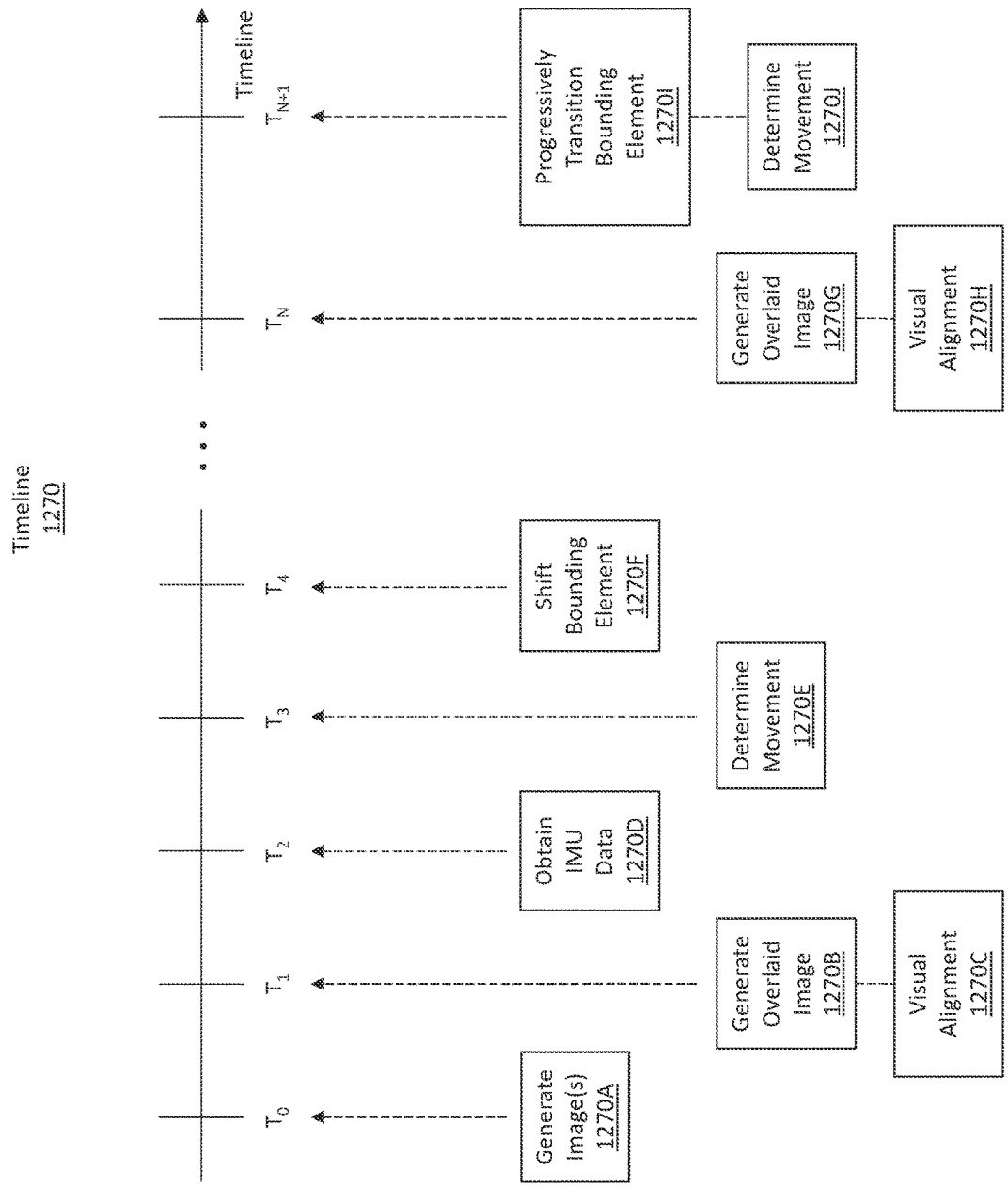
FIG. 12C illustrates an example timeline of events.

FIG. 12C shows an example timeline 1270 reflecting some of the various operations. Specifically, the timeline 1270 includes various different points in time, as reflected by $T_0$, $T_1$, and so on. At $T_0$, the embodiments generate image(s) 1270A using the system camera and the external camera. At $T_1$, the embodiments generate an overlaid image 1270B using the visual alignment 1270C process described in FIG. 10. At $T_2$, the embodiments obtain IMU data 1270D, perhaps because the visual alignment process cannot be performed for various reasons, as described earlier. At $T_3$, the embodiments determine movement 1270E and then at $T_4$, the embodiments shift the bounding element 1270F using the IMU data. The process of using the IMU data to shift the bounding element can occur any number of times until the option to use visual alignment becomes available again, as shown at $T_N$. Specifically, at $T_N$, the embodiments generate an overlaid image 1270G using the visual alignment 1270H process described in FIG. 12A.

At $T_{N+1}$, the embodiments identify that the bounding element is not at the correct position because the IMU-based process introduced some inaccuracies into the placement of the bounding element. In response, the embodiments progressively transition the bounding element 1270I, where the speed by which that progressive transition occurs is based on a determined (relative) movement 1270J of the HMD and the external camera. Because the HMD and cameras are moving, the user will not be able to observe the effects of performing the corrective operations because the bounding element is already shifting as a result of the units moving. Thus the correction can be "hidden" in the movement. The processes outlined in FIG. 12C can repeat any number of times. By performing these processes, the embodiments avoid or refrain "snapping" the bounding element into the correct place.

Figure 13A:
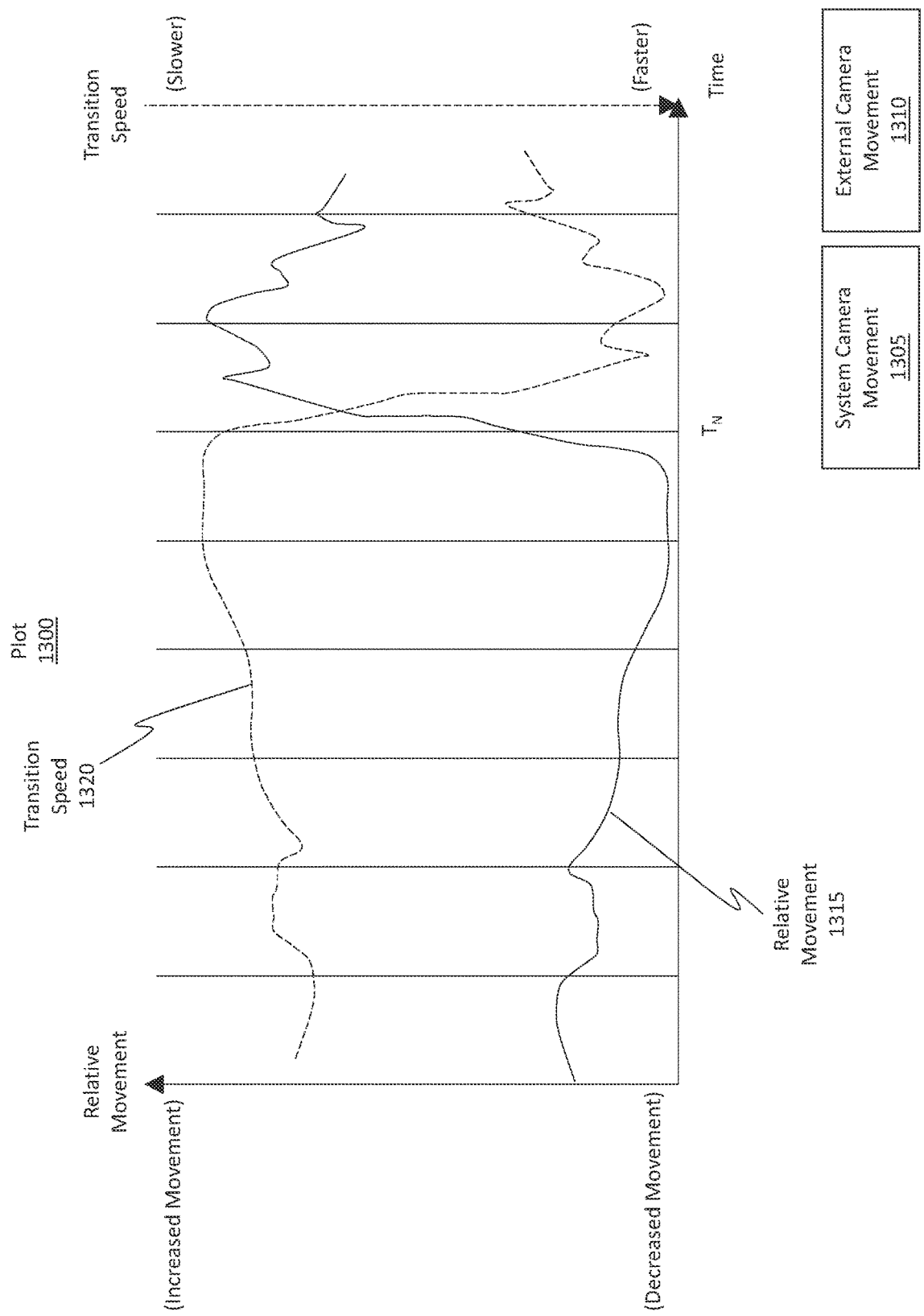
FIG. 13A illustrates a plot mapping out the relative movements between the system camera and the external camera. The speed by which the bounding element is progressively shifted or transitioned is dependent on the relative amount of movement. By scaling the transition speed based on the detected amount of movement, the embodiments can effectively "hide" the corrective transitions from the user because of the movements that are occurring.

FIG. 13A shows a plot 1300 illustrating the proportional relationship between detected relative movement and the speed by which a bounding element is progressively transitioned to a correct position. The left hand axis refers to "relative movement," and the top-portion of the plot refers to increased movement while the bottom-portion of the plot refers to decreased movement. The right hand axis refers to "transition speed," and the top-portion of the plot refers to slower speeds while the bottom-portion of the plot refers to faster speeds.

The embodiments are able to detect the system camera movement 1305 and the external camera movement 1310 (either in an absolute manner and then compute the relative relationship or in a direct manner to determine the relative movement). With that information, the relative movement 1315 can be determined. This relative movement 1315 is illustrated in the plot 1300.

The embodiments base the speed of the transition of the bounding element on the relative movement 1315, as shown by transition speed 1320. Throughout the left-hand portion of the plot 1300, the relative movement 1315 is rather low. Proportionately, the transition speed 1320 is slower. At around $T_N$, the relative movement 1315 increases significantly. Proportionately, the transition speed 1320 substantially increases.

Figure 13B:
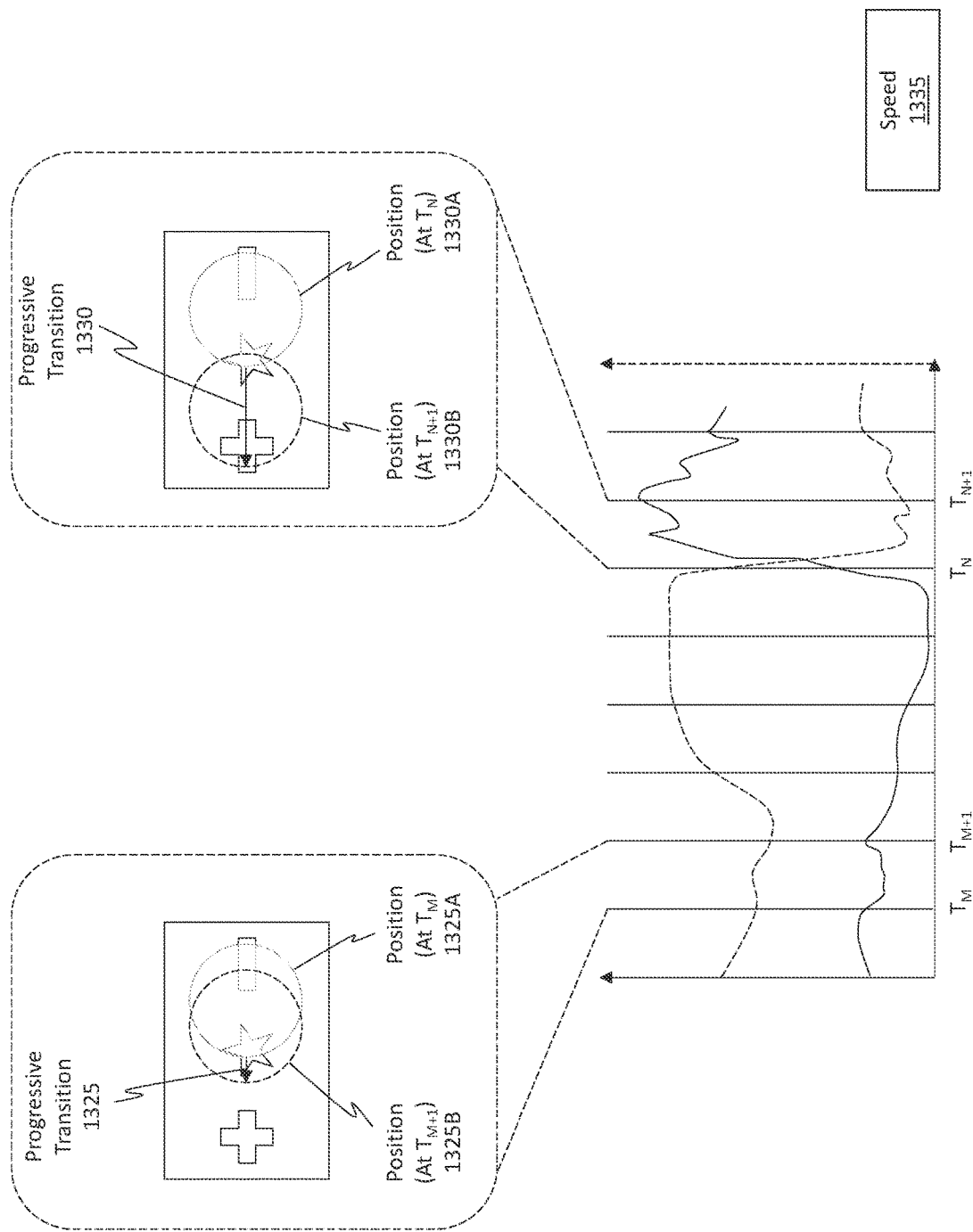
FIG. 13B shows the progressive transition process.

FIG. 13B shows how at $T_M$, the progressive transition 1325 is relatively slow (as shown by the shorter arrow in the bump-out image). For instance, the bubble or bounding element is initially at position 1325A at time $T_M$. Then, at time $T_{M+1}$, the bubble/bounding element is at position 1325B. At $T_N$, however, the progressive transition 1330 is relatively fast (as shown by the longer arrow). For instance, at time $T_N$, the bubble is at position 1330A. At time $T_{N+1}$, the bubble is now at position 1330B. Accordingly, the speed 1335 of the transition is proportional to the detected amount of movement between the HMD and the external camera.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 14:
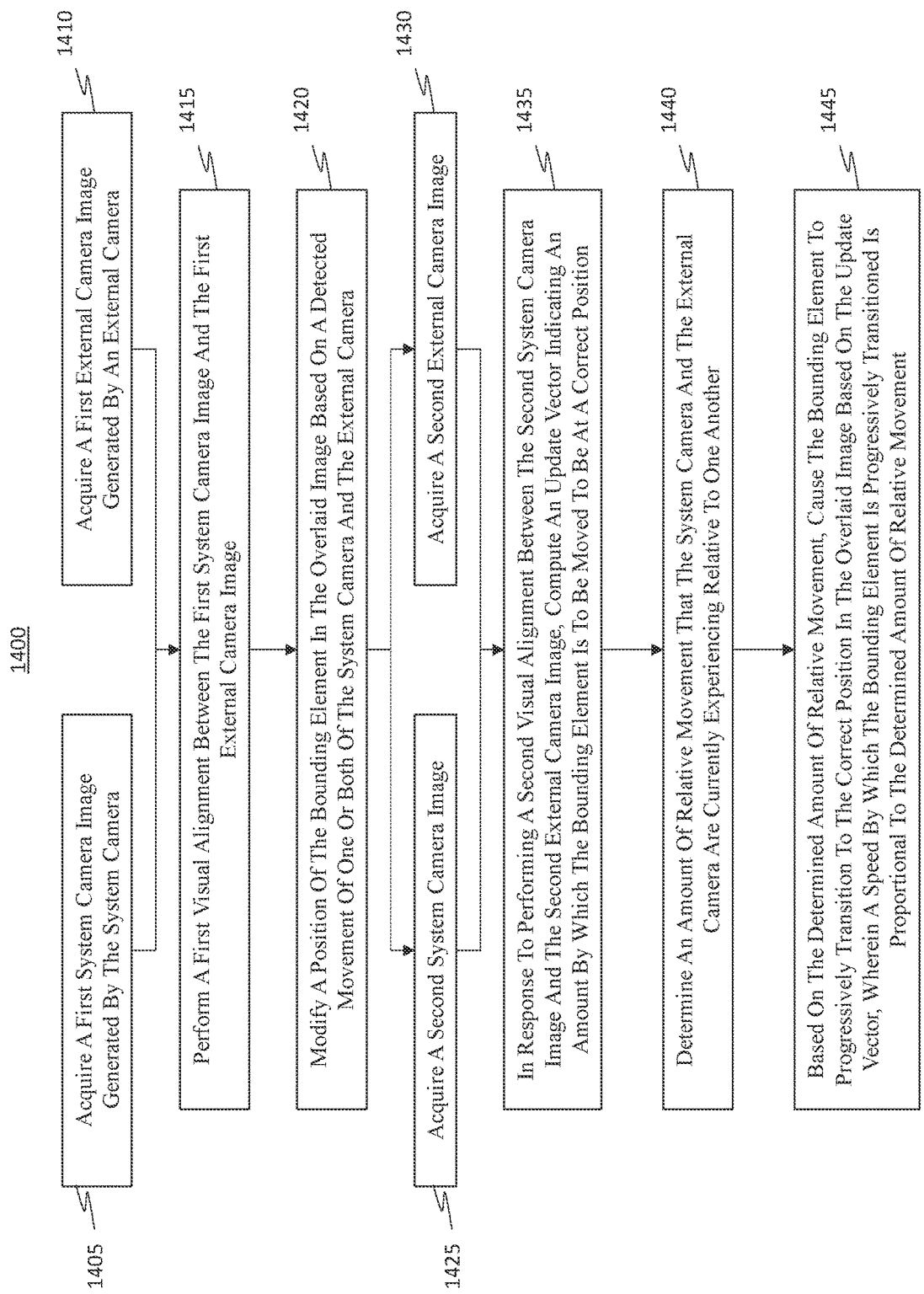
FIG. 14 illustrates a flowchart of an example method for minimizing observation of corrections by scaling performance of the correction based on detected movement conditions.

Attention will now be directed to FIG. 14, which illustrates a flowchart of an example method 1400 for correcting an overlay misalignment between an external camera image and a system camera image and for minimizing observation of the correction by scaling (and even performing) the correction based on detected movement conditions. Method 1400 can be performed by any of the systems and HMDs mentioned herein. Further, the system or HMD can include a system or HMD camera (e.g., system camera 500 of FIG. 5) and a system or HMD inertial measurement unit (IMU) (e.g., system IMU 615 of FIG. 6). The system camera can be a camera selected from a group comprising a visible light camera, a low light camera, or a thermal imaging camera. Similarly, the external camera can also be a camera selected from that group.

Method 1400 includes an act (act 1405) of acquiring a first system camera image (e.g., first system camera image 1000 of FIG. 10) generated by the system camera. In parallel or in serial with act 1405, there is an act (act 1410) of acquiring a first external camera image (e.g., first external camera image 1010) generated by an external camera (e.g., external camera 505 of FIG. 5).

In some cases, the first system camera image includes a system timestamp detailing a time when the first system camera image was generated. Relatedly, the first external camera image can also include an external timestamp detailing a time when the first external camera image was generated. Optionally, the system timestamp and the external timestamp can be synchronized with one another. In some instances, the timestamps can vary but might not exceed a threshold time period (e.g., within 1 ms of each other, 2 ms, 3 ms, 4 ms, 5 ms, 10 ms, 20 ms, 30 ms, or any value therebetween or even some other predetermined value).

Act 1415 involves performing a first visual alignment (e.g., visual alignment 1020 of FIG. 10) between the first system camera image and the first external camera image. The process of performing the first visual alignment includes generating an overlaid image (e.g., overlaid image 1025 of FIG. 10) by projecting at least some content included in the first external camera image on top of corresponding content included in the first system camera image (e.g., the feature point 1015 is positioned overtop of the corresponding feature point 1005). That is, the process of performing the first visual alignment can include identifying common feature points that exist between the first system camera image and the first external camera image. Once identified, then the images can be aligned by overlaying and aligning the corresponding feature points. Additionally, the content can be surrounded by a bounding element (e.g., bounding element 1030). in the overlaid image.

Act 1420 thereafter involves modifying a position of the bounding element in the overlaid image based on a detected movement of one or both of the system camera and the external camera. For instance, the IMU-based alignment process described in FIG. 11 can be performed in order to modify the position of the bounding element. In this scenario, the visual alignment process might not be available, so the IMU-based alignment process is performed. Notably, the modification mentioned in act 1420 occurs not as a result of performing visual alignment; instead, some other technique is performed at this point in time.

As an example, the process of modifying the position of the bounding element can include receiving first IMU data from the system IMU and receiving second IMU data from an IMU associated with the external camera. The process can further include detecting the movement based on the first IMU data and the second IMU data.

Act 1425 involves acquiring a second system camera image (e.g., second system camera image 1200 of FIG. 12A). In parallel or in serial with act 1425, act 1430 involves acquiring a second external camera image (e.g., second external camera image 1210). It should be noted that any number of camera images (e.g., system camera images and external camera images) may have been generated during the IMU-based process. An attempt to perform visual alignment using these camera images may be performed, but that attempt (in this scenario) was not successful. Instead, the embodiments relied on the IMU-based technique to perform alignment.

Visual alignment was not successful for various potential reasons, as described earlier (e.g., perhaps an insufficient number of feature points were detected). Therefore, while the term "second" is being used to describe "second system camera image" and "second external camera image," this term should not be construed as referring to an image that was sequentially generated after the first image. Indeed, this so-called "second" image may have been the third-produced, fourth-produced, $5^{th}$-produced, or even $100^{th}$-produced image after the first image was produced. Those other intervening images were simply not sufficient to perform visual alignment.

In response to performing a second visual alignment (e.g., visual alignment 1220 in FIG. 12A), between the second system camera image and the second external camera image, act 1435 involves computing an update vector. Optionally, this update vector can indicate an amount by which the bounding element is to be moved to be at a correct position. Optionally, the update vector can indicate an absolute position of where the bounding element should be located. Based on the absolute position, the embodiments can then compute an amount of movement that the bounding element should move. Stated differently, the embodiments determine that a current position of the bounding element is incorrect. For example, the current position 1235 of the bounding element 1230 in FIG. 12A refers to an incorrect position. The correct position 1240 is where the bounding element 1230 should be located. Because of inaccuracies in the IMU-based technique, however, the bounding element 1230 is out-of-position and should be corrected. Additionally, the process of performing the second visual alignment can include identifying common feature points that exist between the second system camera image and the second external camera image.

When reference is made to the bounding element not being in the correct position, it should be noted how the content that was extracted from the second external camera image and that is currently being displayed is still accurate and true, meaning that if a first responder were to aim the tool by focusing in on the content displayed by the second external camera image, the first responder can be assured that he/she is still viewing the correct location where the tool is being aimed. Therefore, while the bubble position might not be accurate, the first responder would still observe the correct area where the tool is being aimed by viewing the content from the second external camera image.

Act 1440 then includes determining an amount of relative movement (e.g., relative movement 1315 from FIG. 13A) that the system camera and the external camera are currently experiencing relative to one another. In one example scenario, this determination can optionally be based on IMU data received from both of the system IMU and an external IMU that is associated with the external camera (e.g., IMU data 1255 and IMU data 1265 in FIG. 12B). In another scenario, the amount of camera motion can optionally be determined or computed using visual image data. Then, based on the determined amount of relative movement, act 1445 includes causing the bounding element to progressively transition (e.g., progressively transition 1245A in FIG. 12B) to the correct position (e.g., correct position 1240) in the overlaid image based on the update vector. Notably, a speed (e.g., speed 1245C in FIG. 12B) by which the bounding element is progressively transitioned is proportional to the determined amount of relative movement.

Here, a relatively larger amount of relative movement results in a relatively faster speed by which the bounding element is progressively transitioned. Similarly, a relatively smaller amount of relative movement results in a relatively slower speed by which the bounding element is progressively transitioned.

Figure 15:
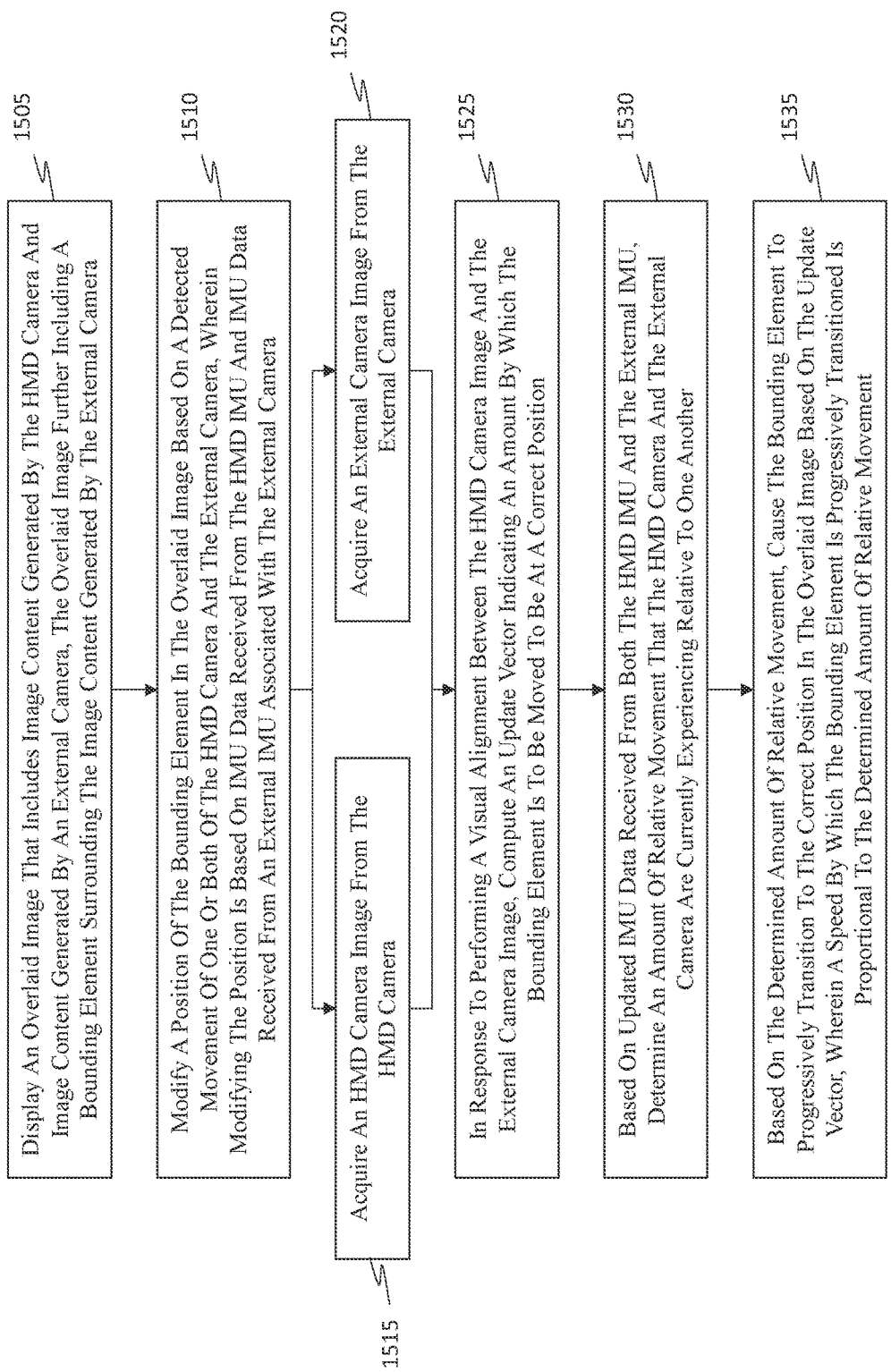
FIG. 15 illustrates another flowchart of an example method for performing corrective operations.

FIG. 15 shows another flowchart of an example method 1500. Method 1500 can, for example, be performed by an HMD, which is configured to correct an overlay misalignment between an external camera image and a system camera image and which is configured to minimize observation of the correction by scaling and performing the correction based on detected movement conditions. The HMD can include an HMD camera and an HMD inertial measurement unit (IMU).

Method 1500 includes an act (act 1505) of displaying an overlaid image that includes image content generated by the HMD camera and image content generated by an external camera. The overlaid image further includes a bounding element that surrounds the image content generated by the external camera.

Act 1510 includes modifying a position of the bounding element in the overlaid image based on a detected movement of one or both of the HMD camera and the external camera. This process of modifying the position is based on IMU data received from the HMD IMU and IMU data received from an external IMU associated with the external camera.

Act 1515 includes acquiring an HMD camera image from the HMD camera. In parallel or in serial with act 1515, act 1520 includes acquiring an external camera image from the external camera.

In response to performing a visual alignment between the HMD camera image and the external camera image, act 1525 includes computing an update vector indicating an amount by which the bounding element is to be moved to be at a correct position. Additionally, or alternatively, the update vector can reflect an absolute position where the bounding element should be located. Based on updated IMU data received from both the HMD IMU and the external IMU, act 1530 involves determining an amount of relative movement that the HMD camera and the external camera are currently experiencing relative to one another.

Based on the determined amount of relative movement, act 1535 includes causing the bounding element to progressively transition to a corrected position in the overlaid image. Beneficially, a speed by which the bounding element is progressively transitioned is proportional to the determined amount of relative movement.

In scenarios where the external camera is aimed outside of the FOV of the system camera, then the bubble will leave the view of the system camera and will not be displayed in the overlaid image. Eventually, when the external camera's FOV again overlaps the system camera's FOV, then the embodiments (in that scenario) can permit the bubble to "snap" back into view. Regardless of how the FOVs no longer overlap (e.g., due to vertical or horizontal movements), the bubble can be snapped back into position once the overlap condition again occurs. Thereafter, the disclosed principles can be followed to ensure a smooth alignment.

Accordingly, the disclosed embodiments beneficially minimize the ability to observe the correction of a bubble's position when a "visual alignment" process is performed subsequent in time to an "IMU-based" alignment process. In doing so, the embodiments significantly improve the user's experience with the mixed-reality system. The embodiments also provide improved visual alignment and imagery.

Example Computer/Computer Systems

Figure 16:
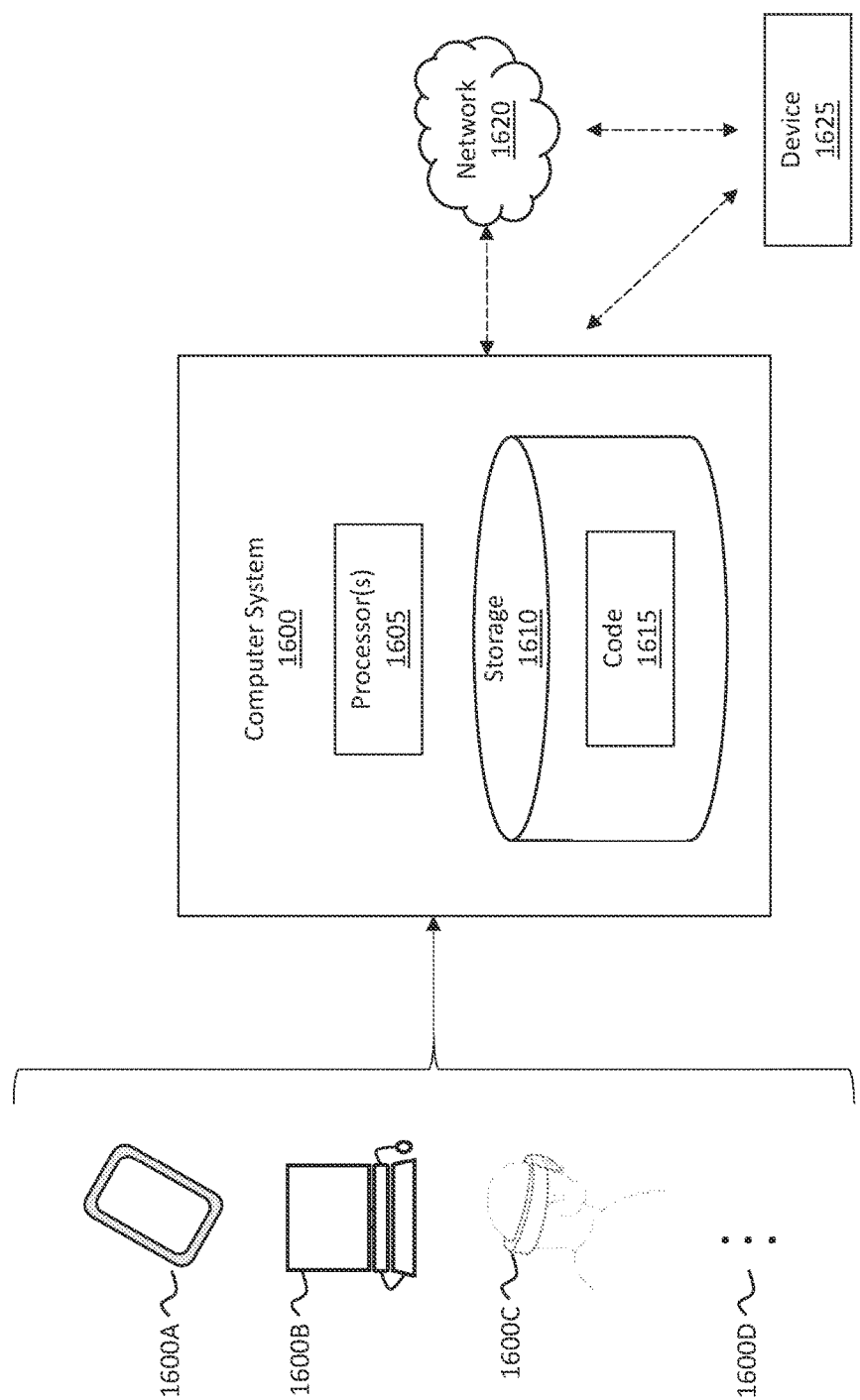
FIG. 16 illustrates an example computer system configured to perform any of the disclosed operations.

Attention will now be directed to FIG. 16 which illustrates an example computer system 1600 that may include and/or be used to perform any of the operations described herein. Computer system 1600 may take various different forms. For example, computer system 1600 may be embodied as a tablet 1600A, a desktop or a laptop 1600B, a wearable device 1600C (e.g., any of the HMDs discussed herein), a mobile device, or any other standalone device. The ellipsis 1600D illustrates how other form factors can be used. Computer system 1600 may also be a distributed system that includes one or more connected computing components/devices that are in communication with computer system 1600.

In its most basic configuration, computer system 1600 includes various different components. FIG. 16 shows that computer system 1600 includes one or more processor(s) 1605 (aka a "hardware processing unit") and storage 1610.

Regarding the processor(s) 1605, it will be appreciated that the functionality described herein can be performed, at least in part, by one or more hardware logic components (e.g., the processor(s) 1605). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1600. The different components, modules, engines, and services described herein may be implemented as objects or processors that execute on computer system 1600 (e.g. as separate threads).

Storage 1610 may be physical system memory, which may be volatile, non-volatile, or some combination of the two. The term "memory" may also be used herein to refer to non-volatile mass storage such as physical storage media. If computer system 1600 is distributed, the processing, memory, and/or storage capability may be distributed as well.

Storage 1610 is shown as including executable instructions 1615. The executable instructions 1615 represent instructions that are executable by the processor(s) 1605 of computer system 1600 to perform the disclosed operations, such as those described in the various methods.

The disclosed embodiments may comprise or utilize a special-purpose or general-purpose computer including computer hardware, such as, for example, one or more processors (such as processor(s) 1605) and system memory (such as storage 1610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1600 may also be connected (via a wired or wireless connection) to external sensors (e.g., one or more remote cameras) or devices via a network 1620. For example, computer system 1600 can communicate with any number devices (e.g., device 1625 such as an external camera) or cloud services to obtain or process data. In some cases, network 1620 may itself be a cloud network. Furthermore, computer system 1600 may also be connected through one or more wired or wireless networks to remote/separate computer systems(s) that are configured to perform any of the processing described with regard to computer system 1600.

A "network," like network 1620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1600 will include one or more communication channels that are used to communicate with the network 1620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that repositions a bounding element in an overlaid image, said computer system comprising:
  one or more processors; and one or more computer-readable hardware storage devices that store instructions that are executable to cause the computer system to:
- access a first image;
- access a second image;
- visually align the first image and the second image;
- generate an overlaid image based on said visual alignment, wherein the overlaid image includes content from both the first image and the second image, and wherein selected content within the overlaid image is surrounded by the bounding element;
- compute an update vector indicating an amount by which the bounding element is to be moved in response to a detected movement associated with a camera that generated at least one of the first image or the second image; and
- cause the bounding element to progressively transition to a new position based on the update vector, wherein a speed by which the bounding element is progressively transitioned is based on the detected movement for the camera.

2. The computer system of claim 1, wherein a relatively larger amount of detected movement for the camera results in a relatively faster speed by which the bounding element is progressively transitioned while a relatively smaller amount of detected movement for the camera results in a relatively slower speed by which the bounding element is progressively transitioned.

3. The computer system of claim 1, wherein the camera is a camera selected from a group comprising a visible light camera, a low light camera, or a thermal imaging camera.

4. The computer system of claim 1, wherein the first image includes a timestamp detailing a time when the first image was generated, and wherein the second image includes a timestamp detailing a time when the second image was generated.

5. The computer system of claim 1, wherein the computer system includes an inertial measurement unit (IMU), and wherein detecting the movement is performed using data from the IMU.

6. The computer system of claim 1, wherein the first image is generated by a first camera and the second image is generated by a second, different camera.

7. The computer system of claim 1, wherein said visual alignment includes identifying common feature points that exist between the first image and the second image.

8. The computer system of claim 1, wherein the bounding element has a circular shape.

9. The computer system of claim 1, wherein the first image is generated by a first camera having a refresh rate between about 20 Hz and about 120 Hz.

10. The computer system of claim 1, wherein the bounding element includes a circular bubble visualization.

11. A method for repositioning a bounding element in an overlaid image, said method comprising:
- accessing a first image;
- accessing a second image;
- visually aligning the first image and the second image;
- generating an overlaid image based on said visual alignment, wherein the overlaid image includes content from both the first image and the second image, and wherein selected content within the overlaid image is surrounded by the bounding element;
- computing an update vector indicating an amount by which the bounding element is to be moved in response to a detected movement associated with a camera that generated at least one of the first image or the second image; and
- causing the bounding element to progressively transition to a new position based on the update vector, wherein a speed by which the bounding element is progressively transitioned is based on the detected movement for the camera.

12. The method of claim 11, wherein the first image is a low light image, and wherein the second image is a thermal image.

13. The method of claim 11, wherein the first image is one of a visible light image, a low light image, or a thermal image, and wherein the second image is a different one of the visible light image, the low light image, or the thermal image.

14. The method of claim 11, wherein said visual alignment aligns content from the second image with corresponding content from the first image.

15. The method of claim 11, wherein the second image is one of: a visible light image, a low light image, or a thermal image.

16. The method of claim 11, wherein the bounding element includes a circular bubble visualization.

17. The method of claim 11, wherein the first image is one of: a visible light image, a low light image, or a thermal image.

18. A head-mounted device (HMD) that repositions a bounding element in an overlaid image, said HMD comprising:
- one or more processors; and
- one or more computer-readable hardware storage devices that store instructions that are executable to cause the one or more processors to:
  - access a first image;
  - access a second image;
  - visually align the first image and the second image;
  - generate an overlaid image based on said visual alignment, wherein the overlaid image includes content from both the first image and the second image, and wherein selected content within the overlaid image is surrounded by the bounding element;
  - compute an update vector indicating an amount by which the bounding element is to be moved in response to a detected movement associated with a camera that generated at least one of the first image or the second image; and
  - cause the bounding element to progressively transition to a new position based on the update vector, wherein a speed by which the bounding element is progressively transitioned is based on the detected movement for the camera.

19. The HMD of claim 18, wherein a relatively larger amount of detected movement for the camera results in a relatively faster speed by which the bounding element is progressively transitioned while a relatively smaller amount of detected movement for the camera results in a relatively slower speed by which the bounding element is progressively transitioned.

20. The HMD of claim 18, wherein said visual alignment includes identifying common feature points that exist between the first image and the second image.

* * * * *